(12) United States Patent
Kang et al.

(10) Patent No.: US 12,495,412 B2
(45) Date of Patent: Dec. 9, 2025

(54) METHOD FOR TRANSMITTING AND RECEIVING UPLINK CHANNEL IN WIRELESS COMMUNICATION SYSTEM, AND DEVICE FOR SAME

(71) Applicant: LG ELECTRONICS INC., Seoul (KR)

(72) Inventors: Jiwon Kang, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 525 days.

(21) Appl. No.: 17/608,035

(22) PCT Filed: Apr. 29, 2020

(86) PCT No.: PCT/KR2020/005770
§ 371 (c)(1),
(2) Date: Nov. 1, 2021

(87) PCT Pub. No.: WO2020/222567
PCT Pub. Date: Nov. 5, 2020

(65) Prior Publication Data
US 2022/0217746 A1 Jul. 7, 2022

Related U.S. Application Data

(60) Provisional application No. 62/841,119, filed on Apr. 30, 2019.

(51) Int. Cl.
*H04W 72/1268* (2023.01)
*H04B 7/06* (2006.01)
*H04W 8/24* (2009.01)
*H04W 72/23* (2023.01)

(52) U.S. Cl.
CPC .... *H04W 72/1268* (2013.01); *H04B 7/06956* (2023.05); *H04B 7/06966* (2023.05); *H04W 8/24* (2013.01); *H04W 72/23* (2023.01)

(58) Field of Classification Search
CPC ... H04W 72/1268; H04W 8/24; H04W 72/23; H04W 52/281; H04W 52/365; H04W 52/42; H04B 7/0628; H04B 7/0691; H04B 7/06956; H04B 17/17; H04B 7/0404
USPC ......................................... 370/310, 328, 329
See application file for complete search history.

(56) References Cited

U.S. PATENT DOCUMENTS

2019/0068263 A1* 2/2019 Yu .......................... H04B 7/088
2019/0239245 A1* 8/2019 Davydov .............. H04L 5/0048

OTHER PUBLICATIONS

LG Electronics, Feature lead summary of Enhancements on Multi Beam Operations, Nov. 12-16, 2018, R1-1813944 (Year: 2018).*
Qualcomm Incorporated, Multi-TRP Enhancements, Jan. 21-25, 2019, R1-1900905 (Year: 2019).*
International Search Report in International Appln. PCT/KR2020/005770, dated Aug. 13, 2020, 3 pages.

(Continued)

*Primary Examiner* — Obaidul Huq
(74) *Attorney, Agent, or Firm* — Fish & Richardson P.C.

(57) ABSTRACT

A method for a UE to transmit an uplink channel in a wireless communication system according to an embodiment of the present specification includes: a step for transmitting UE capability information related to a multiple panels; a step for receiving scheduling information related to the transmission of the uplink channel; and a step for transmitting the uplink channel.

16 Claims, 20 Drawing Sheets

(56) References Cited

OTHER PUBLICATIONS

Lenovo, Motorola Mobility, "Discussion of multi-beam operation," R1-1900387, Presented at 3GPP TSG RAN WG1 Ad-Hoc Meeting 1901, Taipei, Jan. 21-25, 2019, 6 pages.
LG Electronics, "Feature lead summary of Enhancements on Multi-beam Operations," R1-1813944, 3GPP TSG RAN WG1 Meeting #95, Spokane, USA, Nov. 12-16, 2018, 25 pages.
Qualcomm Incorporated, "Multi-TRP Enhancements," R1-1900905, Presented at 3GPP TSG-RAN WG1 Meeting AH-1901, Jan. 21-25, 2019 Taipei, Taiwan, 26 pages.
Samsung, "Simultaneous reception of physical channels and reference signals," R1-1812959, Presented at 3GPP TSG RAN WG1 Meeting #95, 3 pages.
Zte, "Enhancements on multi-beam operation," R1-1812257, Presented at 3GPP TSG RAN WG1 Meeting #95, Spokane, USA, Nov. 12-16, 2018, 11 pages.

* cited by examiner

[FIG. 1]
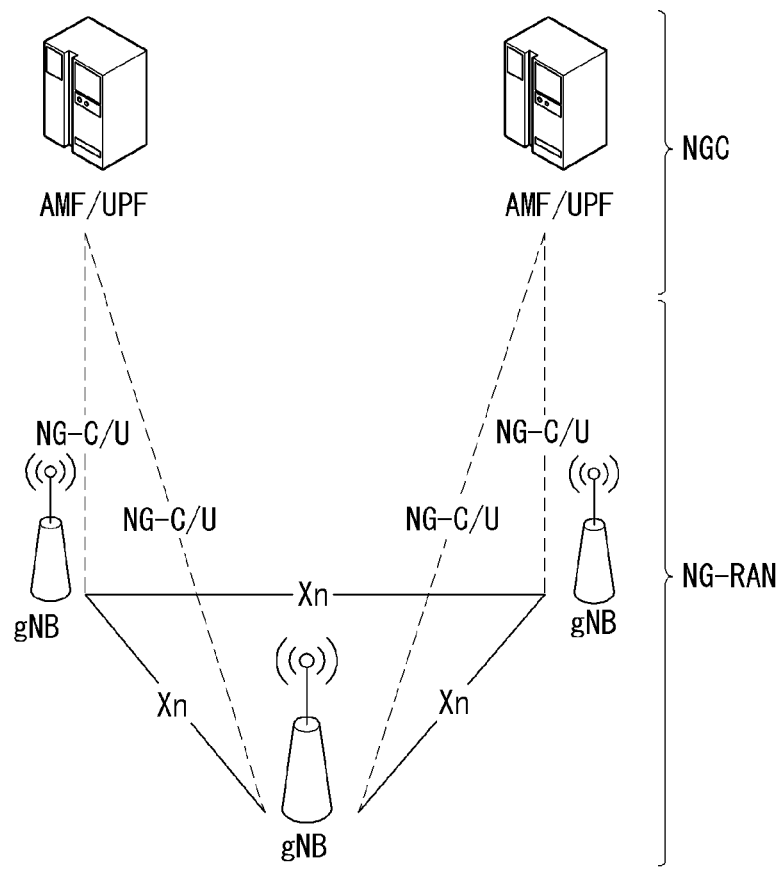
[FIG. 2]
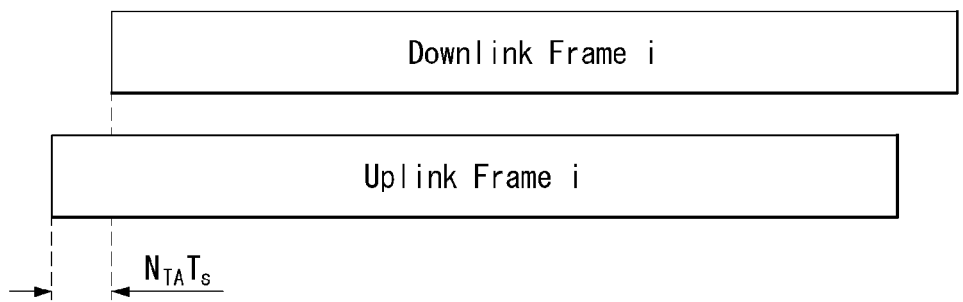

[FIG. 3]
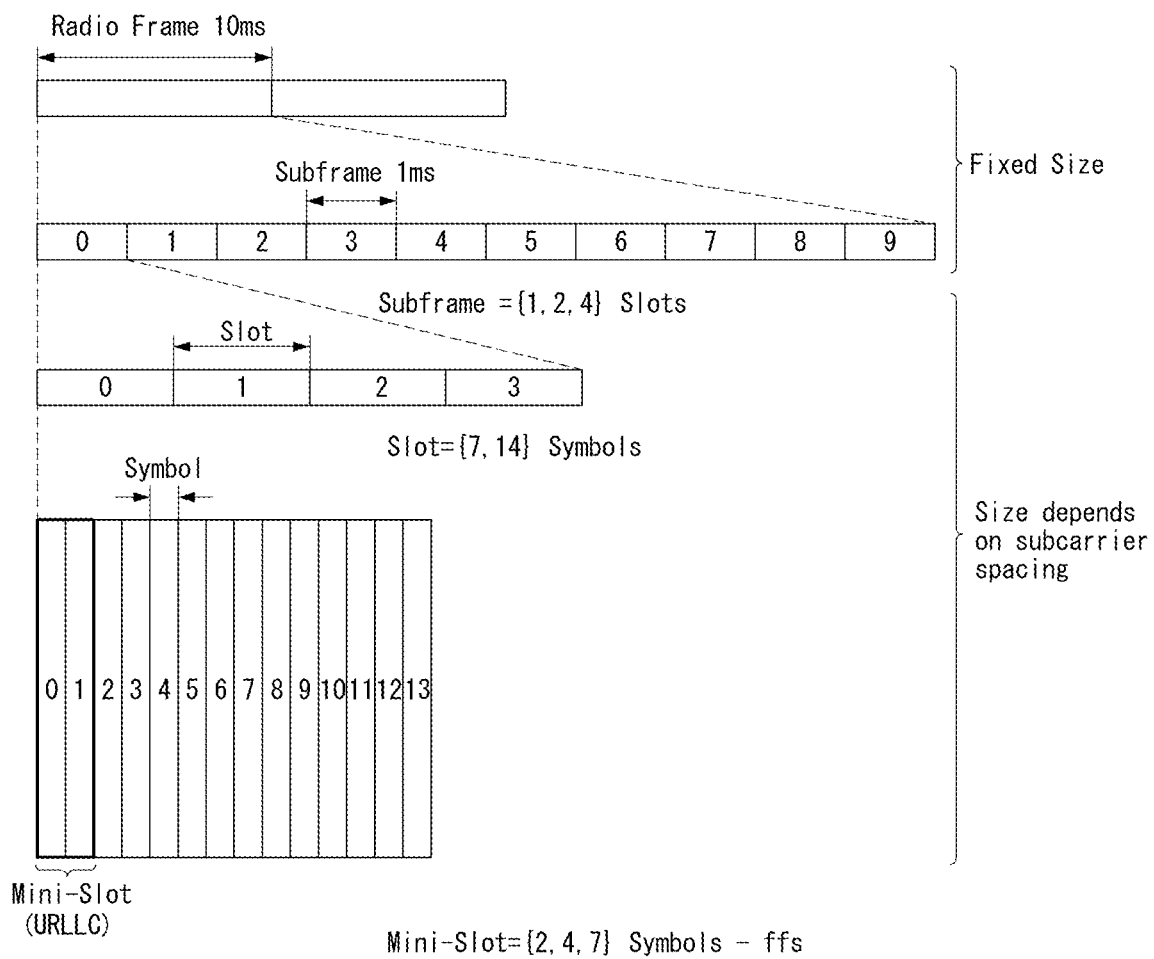

[FIG. 4]
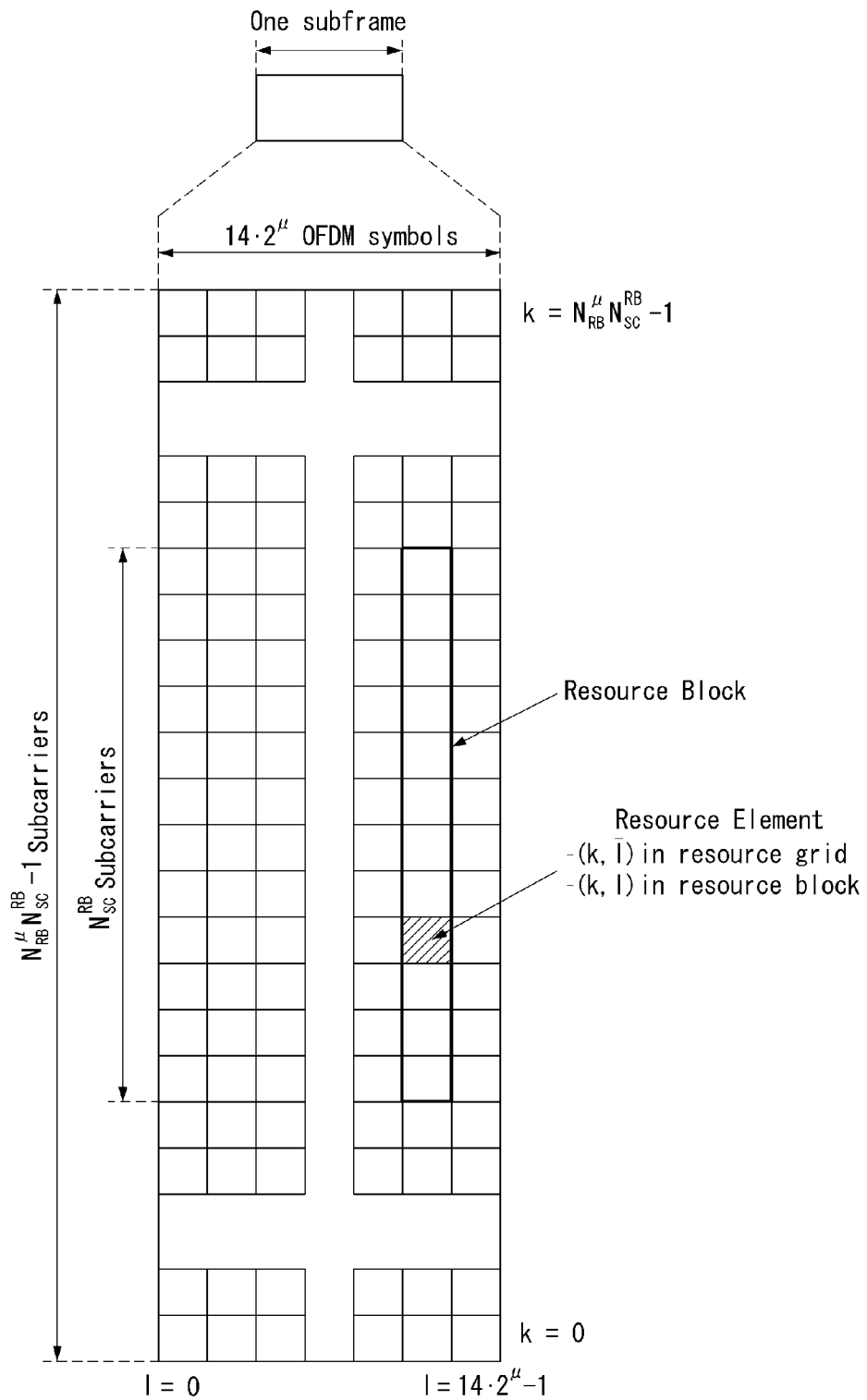

[FIG. 5]
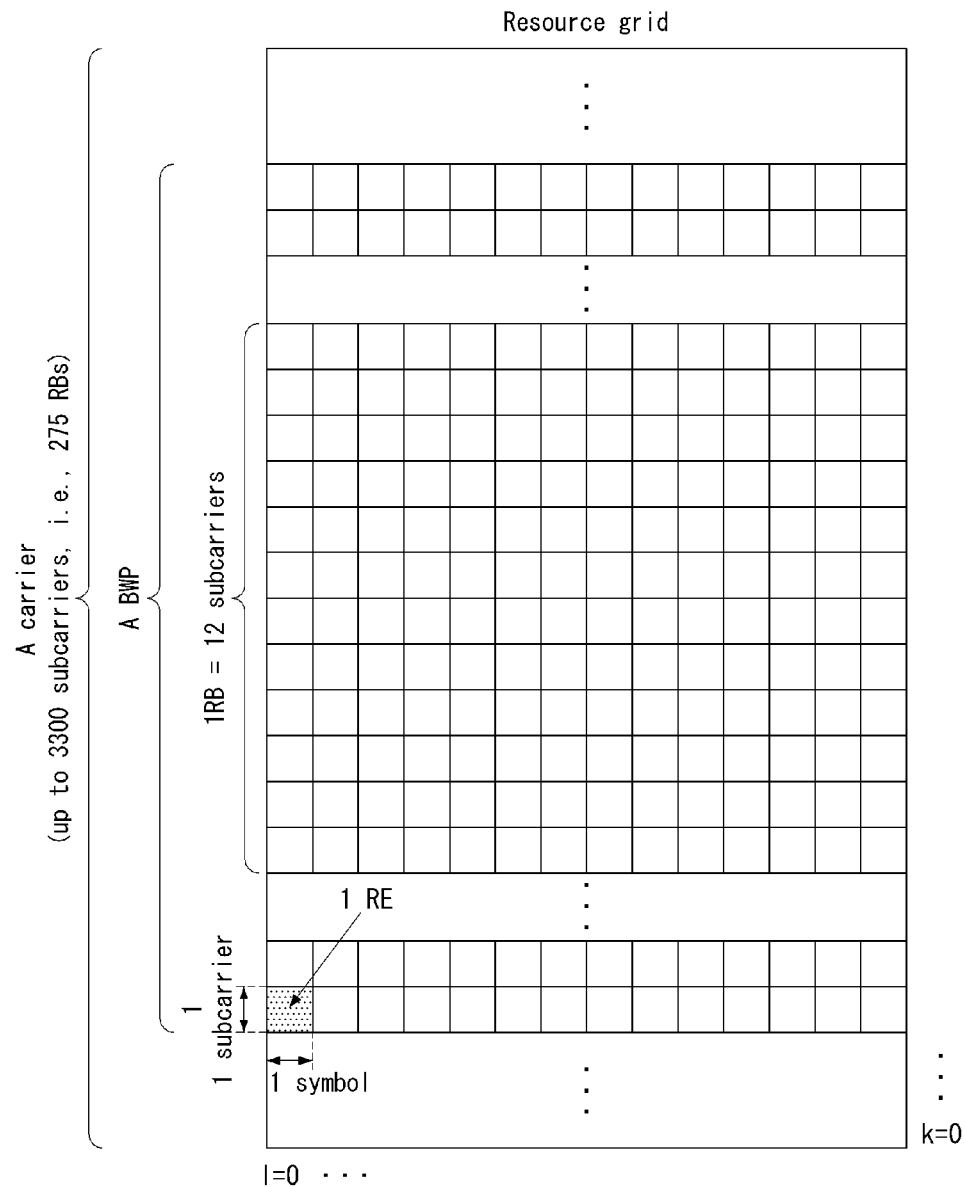

[FIG. 6]
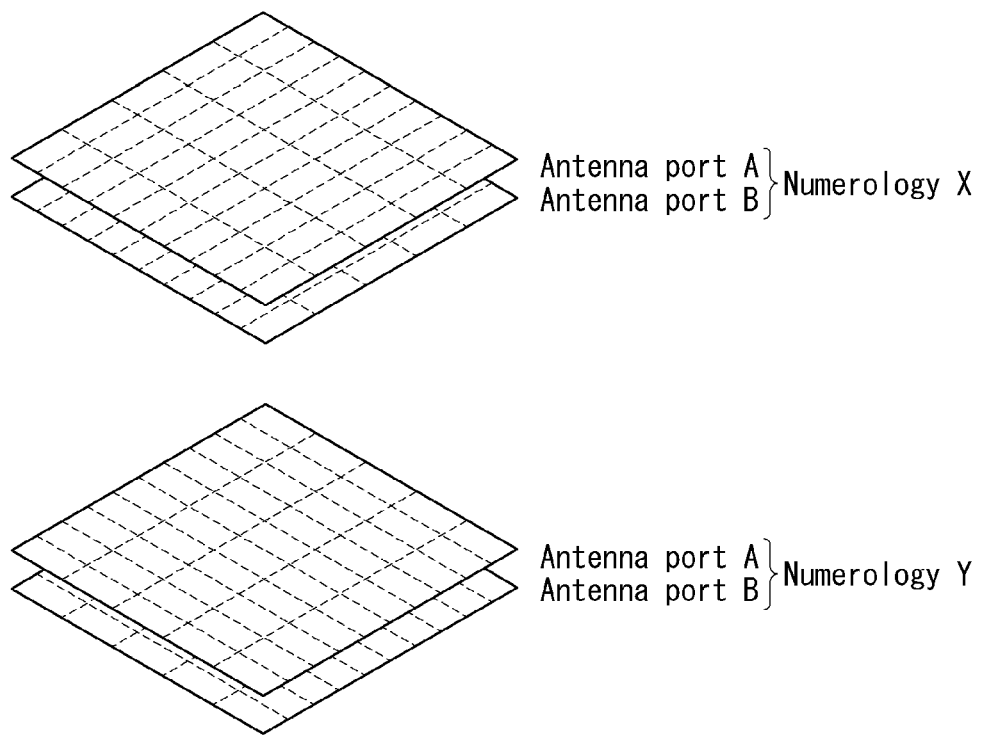

[FIG. 7]
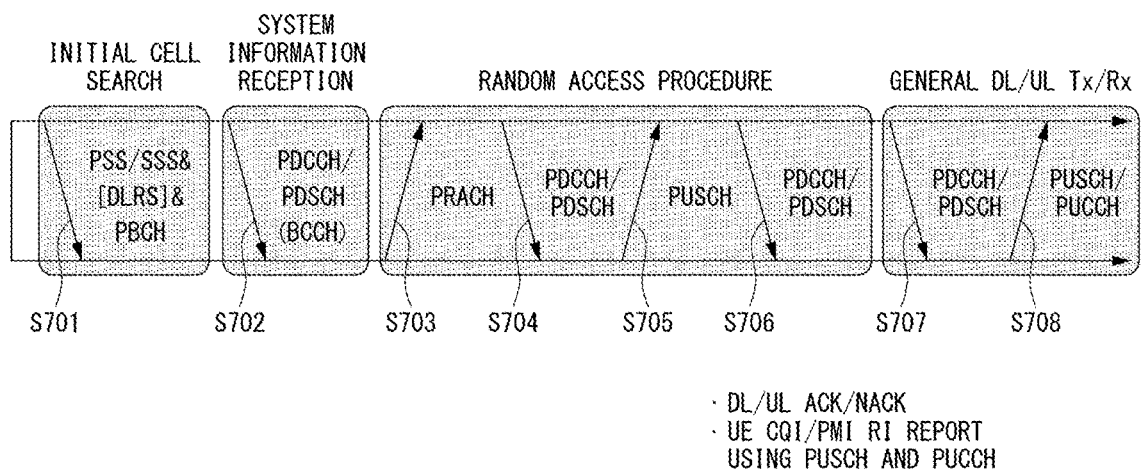

[FIG. 8]
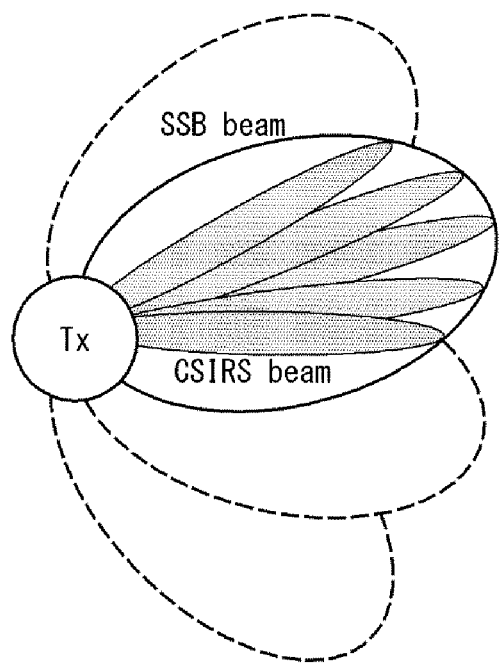

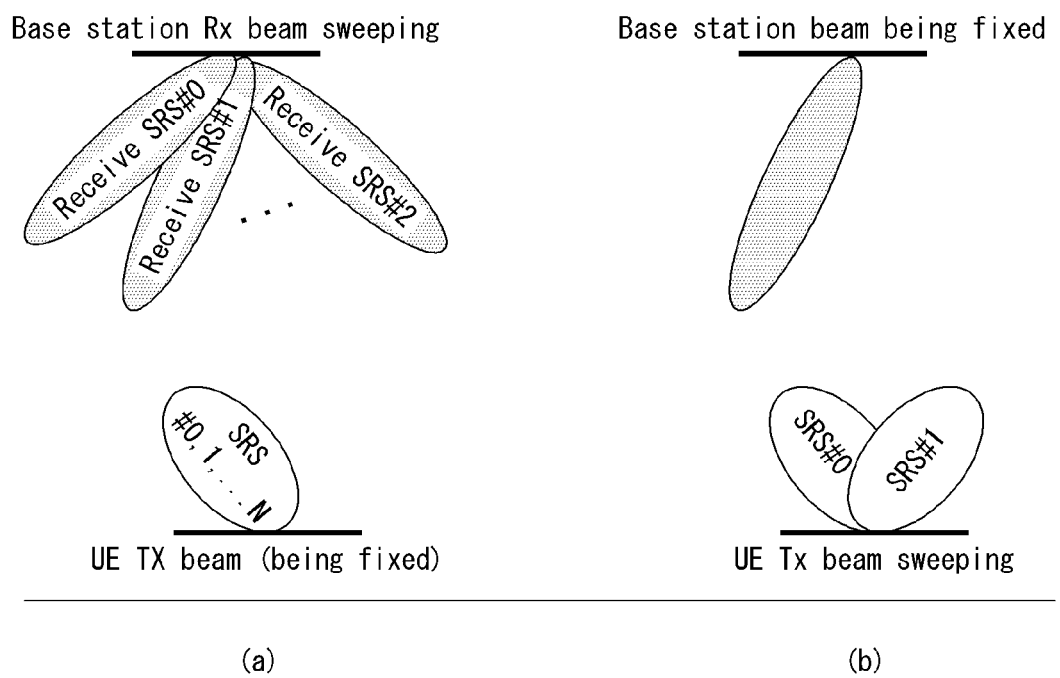

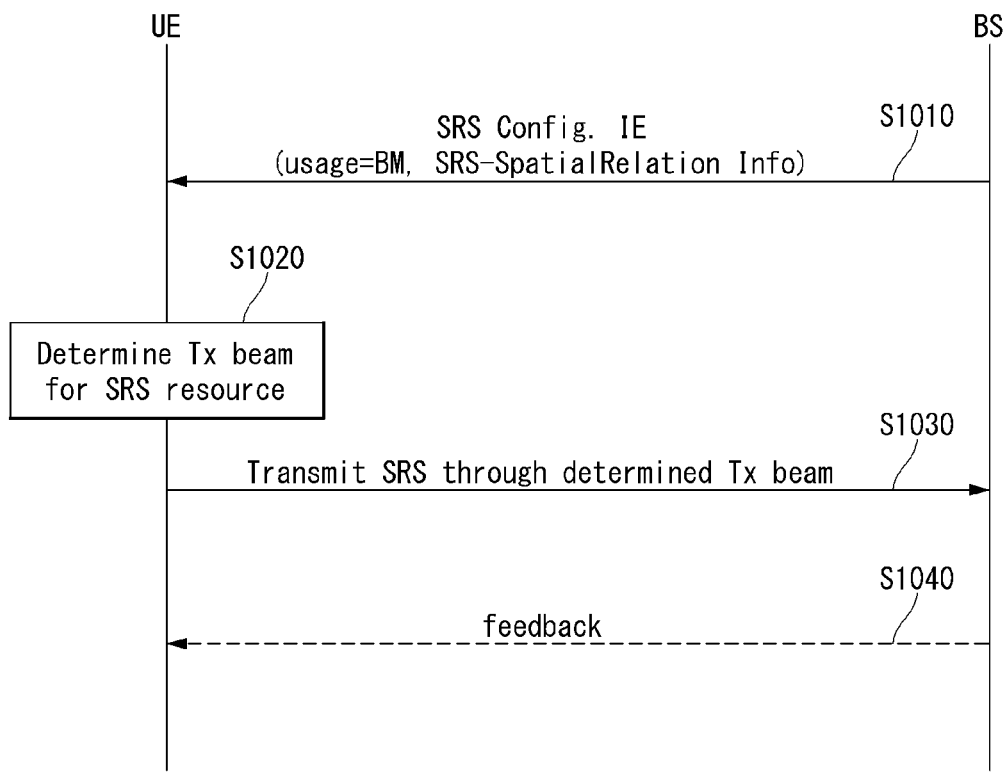

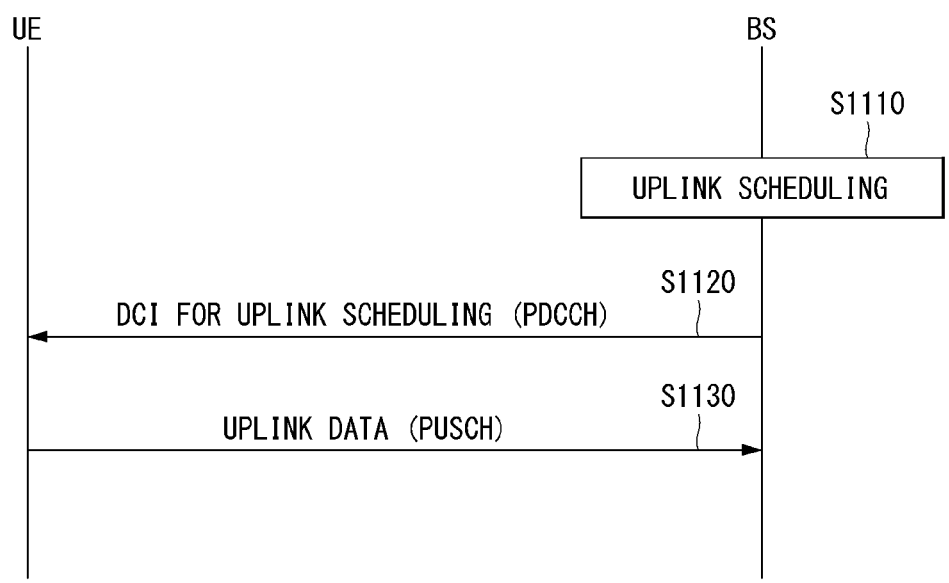
[FIG. 11]

[FIG. 12]
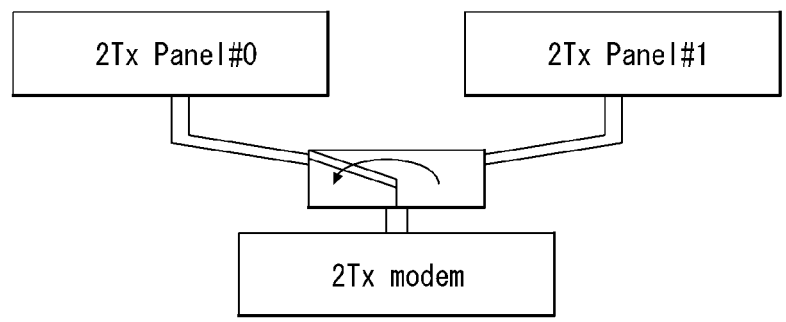

[FIG. 13]
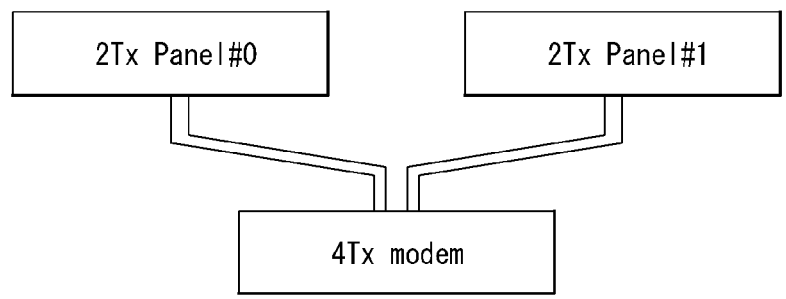

[FIG. 14]
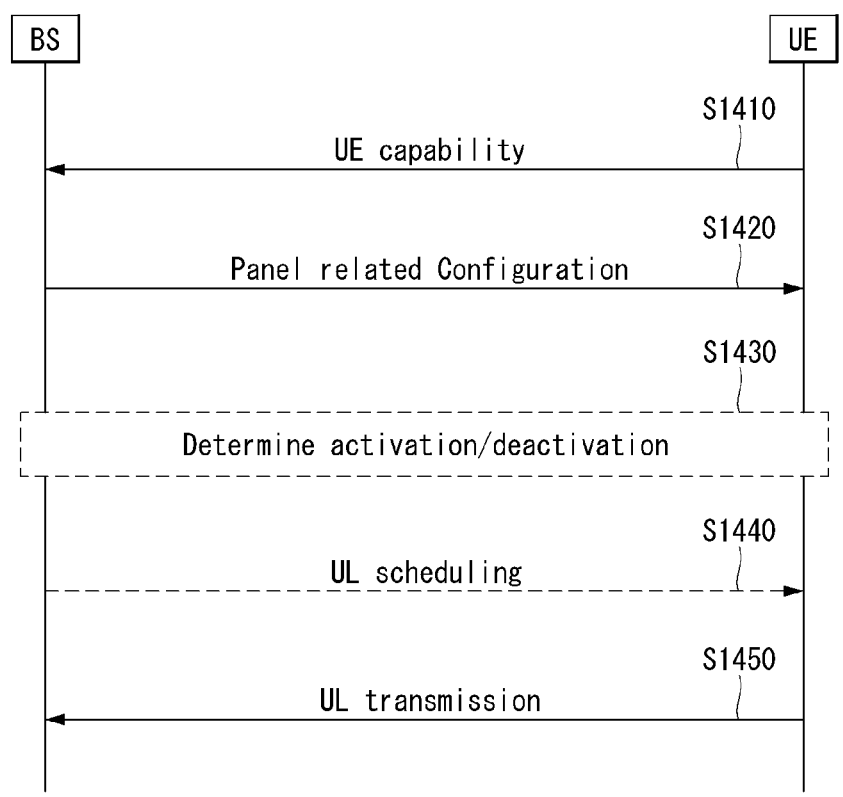

[FIG. 15]
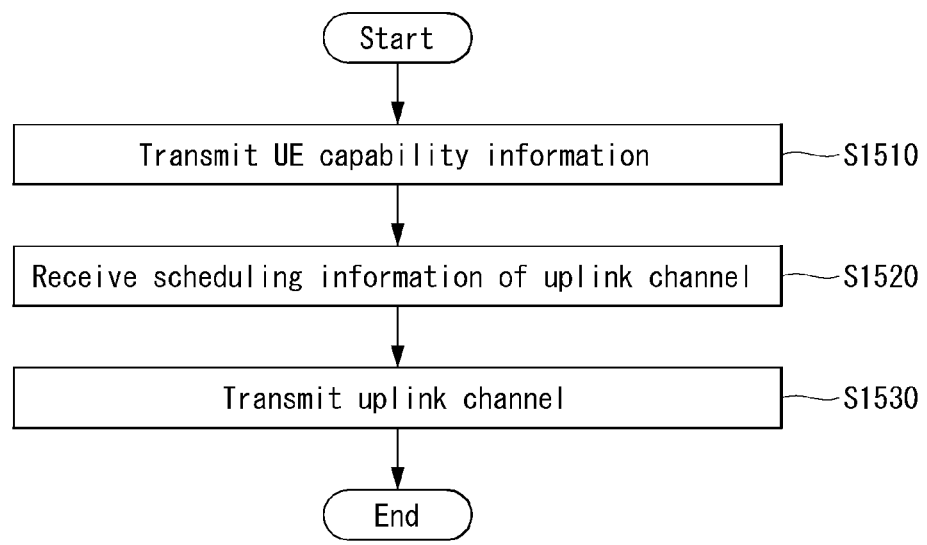

[FIG. 16]
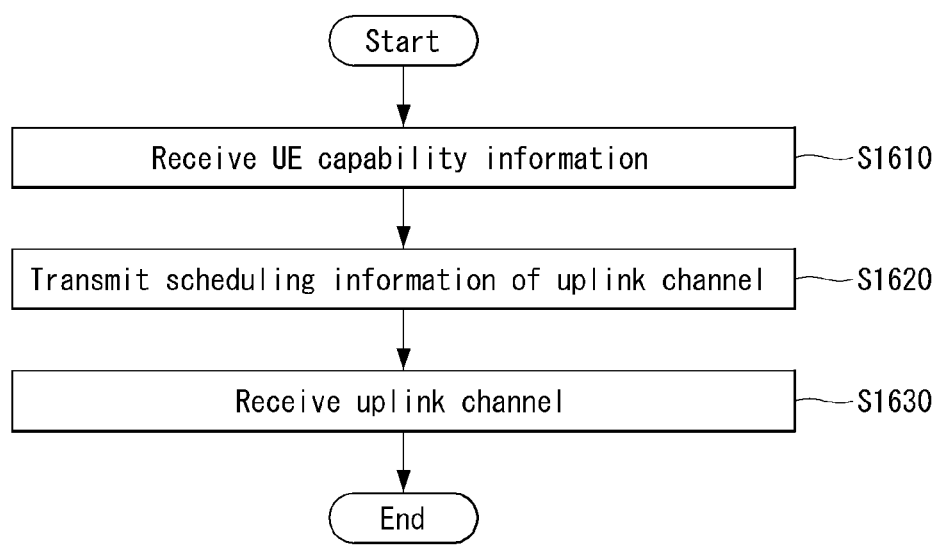

[FIG. 17]
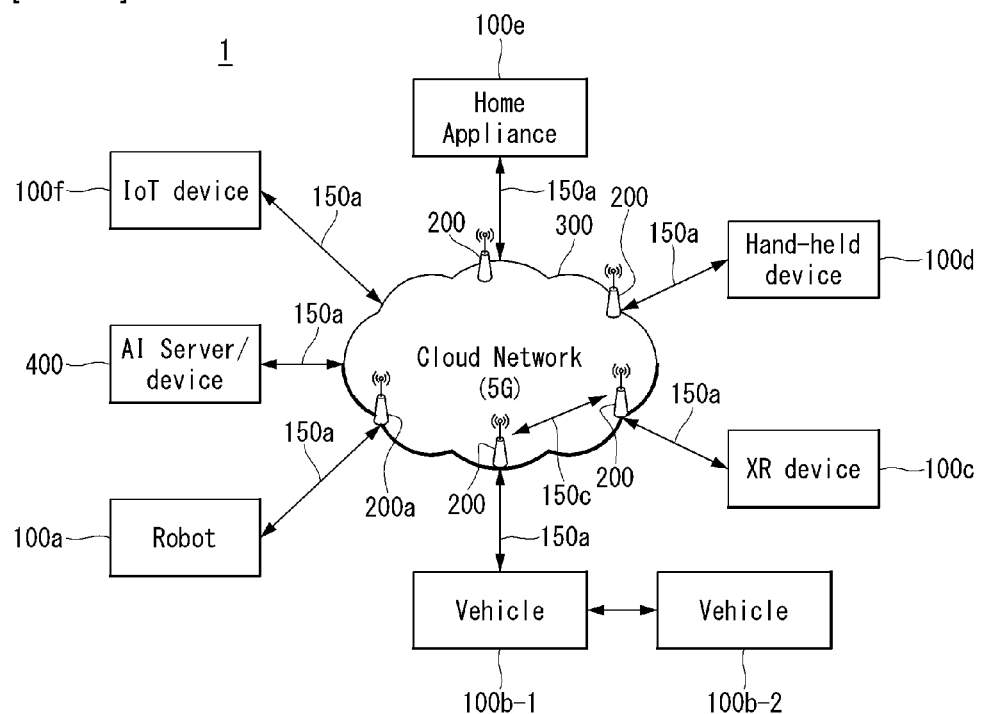

[FIG. 18]
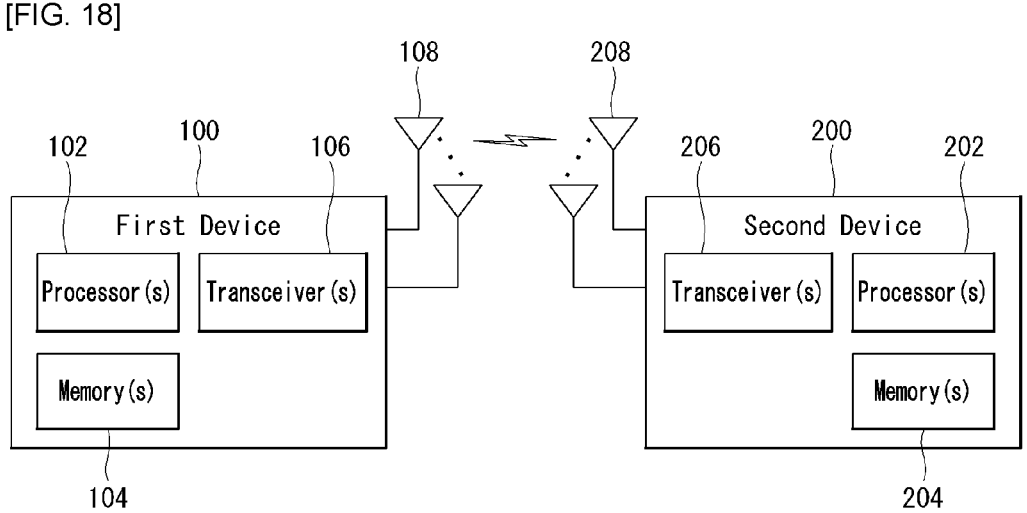

[FIG. 19]
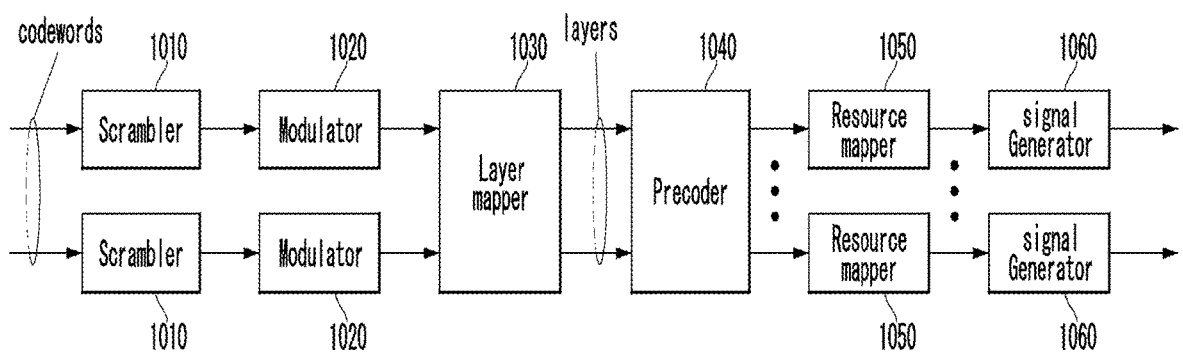

[FIG. 20]
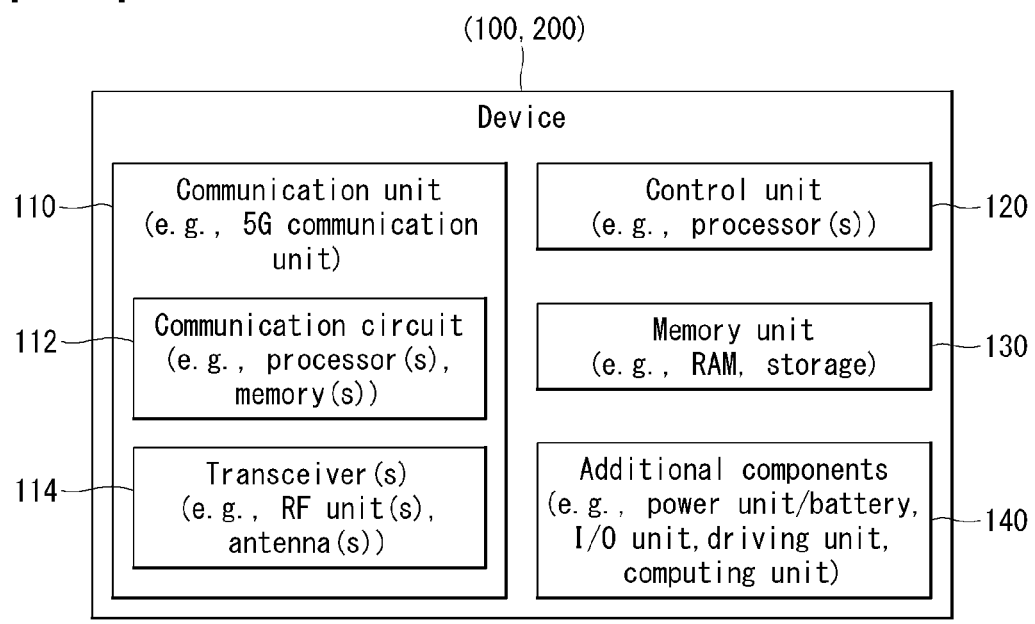

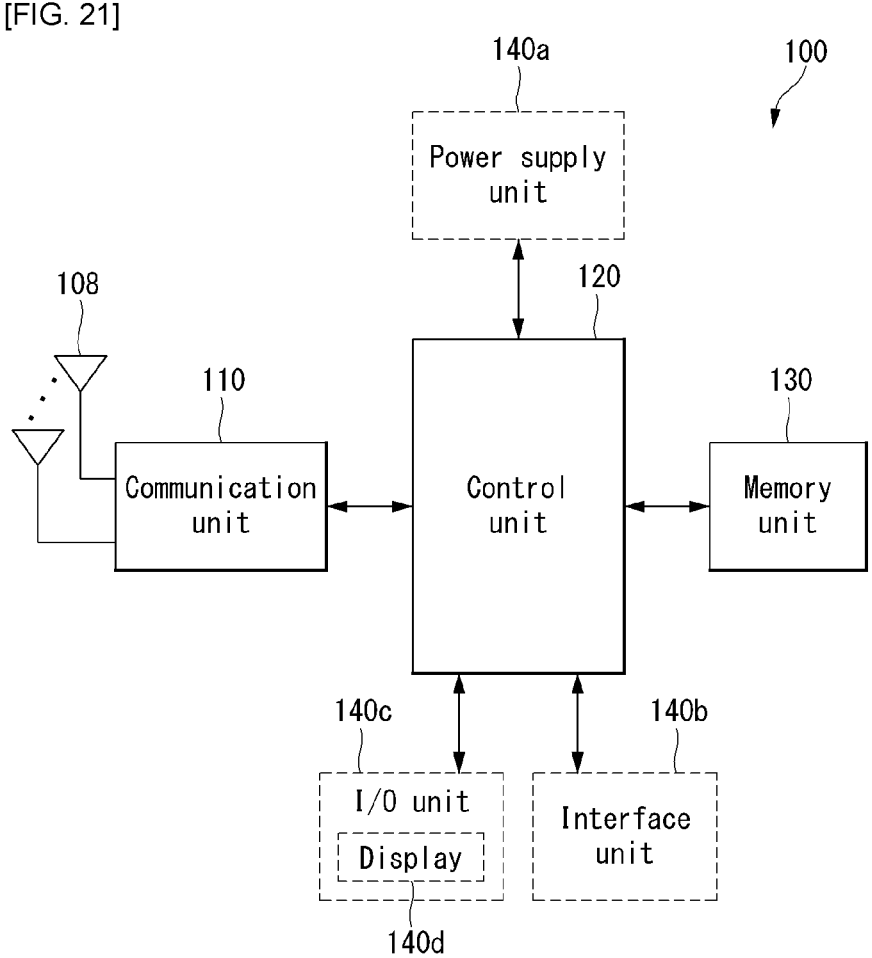
[FIG. 21]

METHOD FOR TRANSMITTING AND RECEIVING UPLINK CHANNEL IN WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2020/005770, filed on Apr. 29, 2020, which claims the benefit of U.S. Provisional Application No. 62/841,119, filed on Apr. 30, 2019, the contents of which are all hereby incorporated by reference herein in their entirety.

TECHNICAL FIELD

The present disclosure relates to a method for transmitting and receiving an uplink channel in a wireless communication system, and a device for the same.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure proposes a method for transmitting an uplink channel of a multi-panel UE.

Specifically, the present disclosure proposes UE capability information for supporting the transmission of the uplink channel by considering an implementation scheme of the multi-panel UE and a multi-carrier based operation. Further, the present disclosure proposes a method related to whether to permit simultaneous transmission of a plurality of uplink channels based on the UE capability information.

The technical objects of the present disclosure are not limited to the aforementioned technical objects, and other technical objects, which are not mentioned above, will be apparently appreciated by a person having ordinary skill in the art from the following description.

Technical Solution

In an aspect, provided is a method for transmitting, by a user equipment (UE), an uplink channel in a wireless communication system, which includes: transmitting UE capability information related to multiple panels; receiving scheduling information related to the transmission of the uplink channel; and transmitting the uplink channel.

The multiple panels are related to a plurality of frequency regions, and the scheduling information includes information representing at least one panel of the multiple panels. The UE capability information includes at least one of i) information on at least one panel commonly applied to at least one frequency region of the multiple frequency regions or ii) information on a range of the frequency regions to which at least panel is commonly applied among the multiple panels.

The frequency region may be based on a component carrier (CC) or a frequency band.

The UE capability information includes information on whether a panel-level correspondence is established, and the panel-level correspondence is established based on at least one frequency region of the multiple frequency regions.

Based on that the panel-level correspondence is established, the information on the at least one panel included in the UE capability information may be information on a transmission (Tx) panel or a reception (Rx) panel. Based on that the panel-level correspondence is not established, the information on the at least one panel included in the UE capability information may include the information on the Tx panel or the Rx panel.

The information on the at least one panel included in the UE capability information may include information on at least one of the number of panels, the number of antenna ports per panel, or the number of beams generable per panel.

The scheduling information includes information on a panel applied to a specific frequency region among the multiple frequency regions, and the information on the panel applied to the specific frequency region may be based on information on a panel applied to a different frequency region which belongs to the range of the frequency regions.

Alteration of the panel applied to the specific frequency region which belongs to the range of the frequency regions may be equally applied to remaining frequency regions which belong to the range of the frequency regions.

The UE capability information may include information on at least one of i) whether the multiple panels may be simultaneously activated or ii) whether the multiple panels may be used for simultaneous transmission of specific uplink channels, and the corresponding information is related to the range of the frequency regions.

Based on that the uplink channel is multiple uplink channels configured in the same time resource region, uplink channels determined based on a first rule related to collision handling among the multiple uplink channels may be transmitted.

The multiple uplink channels may be grouped into multiple uplink channel groups based on a panel ID, and the first rule may be applied to the uplink channels in the uplink channel group.

Based on that the number of multiple uplink channel groups is larger than a predetermined value, uplink channel groups may be determined based on a second rule related to the collision handling among the multiple uplink channel groups.

The number of determined uplink channel groups may be equal to or smaller than the number of panels which may be simultaneously activated among the multiple panels.

The second rule may be related to at least one of transmission power for each panel requested for transmission of each uplink channel which belongs to the multiple uplink channel groups or a priority of each uplink channel.

The uplink channel may be based on multiple uplink channels configured in the same time resource regions and the multiple uplink channels may be based on an uplink channel combination of which simultaneous transmission is permitted.

Based on that the same panel ID is configured in the multiple uplink channels, the multiple uplink channels may be transmitted through a panel related to the panel ID among the multiple panels.

Based on that different panel IDs are configured to the multiple uplink channels, the multiple uplink channels may be transmitted through a panel related to a panel ID configured to a specific uplink channel, and the specific uplink channel may be an uplink channel determined based on a priority, a transmission power, or a power headroom of each uplink channel among the multiple uplink channels.

Only at least one uplink channel according to an order having a high priority may be transmitted among the multiple uplink channels based on that different panel IDs are configured in the multiple uplink channels, and the priority may be based on at least one of a type of uplink channel or a usage of the uplink channel.

In another aspect, provided is a UE transmitting an uplink channel in a wireless communication system, which includes: one or more transceivers; one or more processors controlling the one or more transceivers; and one or more memories operably connectable to the one or more processors, and storing instructions of performing operations when the transmission of the uplink channel is executed by the one or more processors.

The operations include transmitting UE capability information related to multiple panels; receiving scheduling information related to the transmission of the uplink channel; and transmitting the uplink channel.

The multiple panels are related to a plurality of frequency regions, and the scheduling information includes information representing at least one panel of the multiple panels. The UE capability information includes at least one of i) information on at least one panel commonly applied to at least one frequency region of the multiple frequency regions or ii) information on a range of the frequency regions to which at least panel is commonly applied among the multiple panels.

In yet another aspect, provided is a device including: one or more memories and one or more processors functionally connected to the one or more memories.

The one or more processors are configured to control the device to transmit UE capability information related to multiple panels, receive scheduling information related to transmission of an uplink channel, and transmit the uplink channel.

The multiple panels are related to multiple frequency regions and the scheduling information includes information indicating at least one of the multiple panels. The UE capability information includes at least one of i) information on at least one panel commonly applied to at least one frequency region of the multiple frequency regions or ii) information on a range of the frequency regions to which at least panel is commonly applied among the multiple panels.

In still yet another aspect, provided are one or more non-transitory computer-readable media storing one or more instructions.

The one or more instructions executable by one or more processors is configured to control a UE to transmit UE capability information related to multiple panels, receive scheduling information related to transmission of an uplink channel, and transmit the uplink channel.

The multiple panels are related to multiple frequency regions and the scheduling information includes information indicating at least one of the multiple panels. The UE capability information includes at least one of i) information on at least one panel commonly applied to at least one frequency region of the multiple frequency regions or ii) information on a range of the frequency regions to which at least panel is commonly applied among the multiple panels.

Advantageous Effects

According to an embodiment of the present disclosure, scheduling information related to transmission of an uplink channel is transmitted based on UE capability information related to a multiple panels, and as a result, the uplink channel is transmitted. The multiple panels are related to a plurality of frequency regions, and the scheduling information includes information representing at least one panel of the multiple panels. The UE capability information includes at least one of i) information on at least one panel commonly applied to at least one frequency region of the multiple frequency regions or ii) information on a range of the frequency regions to which at least panel is commonly applied among the multiple panels.

Accordingly, scheduling of the uplink channel for multi-channel UE can be performed by considering a single/multi-carrier based operation of the corresponding UE. Further, the transmission of the uplink channel can be performed to be suitable for a multi-panel implementation scheme of the UE, and as a result, reliability of the uplink channel transmission of the multi-panel UE can be improved.

According to an embodiment of the present disclosure, the UE capability information can include information regarding whether panel-level correspondence is established, and the panel-level correspondence can be established based on at least one frequency region of the plurality of frequency regions. Accordingly, the scheduling of the uplink channel can be more effectively performed based on whether the panel-level correspondence is established. Further, when the panel-level correspondence is established, only information on a transmission panel or a reception panel is included in the UE capability information, and as a result, signaling overhead can be reduced.

According to an embodiment of the present disclosure, the scheduling information can include information on a panel applied to a specific frequency region among the plurality of frequency regions, and the information on the panel applied to the specific frequency region can be based on information on a panel applied to another frequency region which belongs to a range of the frequency regions. Accordingly, when the UE transmits the uplink channel based on a specific panel in another frequency region, the corresponding panel information can be utilized, and as a result, a panel indication for scheduling of the transmission of the uplink channel in the specific frequency region can be more effectively performed.

According to an embodiment of the present disclosure, alteration of the panel applied to the specific frequency region which belongs to the range of the frequency regions can be equally applied to remaining frequency regions which belong to the range of the frequency regions. Accordingly, when a specific event such as a beam failure occurs and the panel applied to the specific frequency region is altered, the alteration is equally applied to frequency regions related/adjacent thereto, thereby preventing the signaling overhead from occurring for an update related to panel information.

According to an embodiment of the present disclosure, the UE capability information includes information on at least one of i) whether the multiple panels may be simultaneously activated or ii) whether the multiple panels may be used for simultaneous transmission of specific uplink channels, and the corresponding information may be related to the range of the frequency regions. Accordingly, the scheduling of the uplink channel transmission can be performed in association with the panel implementation scheme of the multi-panel UE and the multi-carrier based operation.

According to an embodiment of the present disclosure, based on that the uplink channel is multiple uplink channels configured in the same time resource region, uplink channels determined based on a first rule related to collision handling among the multiple uplink channels are transmitted. The multiple uplink channels are grouped into multiple uplink channel groups based on a panel ID, and the first rule can be applied to the uplink channels in the uplink channel group. Accordingly, the uplink channels which can be simultaneously transmitted are determined for each panel, and as a result, the collision can be effectively prevented when the multi-panel UE transmits the plurality of uplink channels.

According to an embodiment of the present disclosure, based on that the number of multiple uplink channel groups is larger than a predetermined value, uplink channel groups are determined based on a second rule related to the collision handling among the multiple uplink channel groups. The number of determined uplink channel groups is equal to or smaller than the number of panels which can be simultaneously activated among the multiple panels and the second rule can be related to at least one of transmission power for each panel required for the transmission of each uplink channel which belongs to the plurality of uplink channel groups or a priority of each uplink channel.

As an additional collision management rule (second rule) is applied as such, the plurality of uplink channels can be transmitted within a capability range (the transmission power and the number of activated panels) of the multi-panel UE. Accordingly, the reliability of the transmission of the multiple uplink channels through multiple panels can be improved.

According to an embodiment of the present disclosure, the uplink channel can be based on multiple uplink channels configured in the same time resource regions and the multiple uplink channels can be based on an uplink channel combination of which simultaneous transmission is permitted. According to whether the same panel ID is configured for the multiple uplink channels, the multiple uplink channels can be simultaneously transmitted based on the same panel ID or a panel ID determined according to a configured scheme.

Accordingly, the simultaneous transmission of the multiple uplink channels is permitted based on a preconfigured combination and different panel IDs are configured in the multiple uplink channels, the uplink channels are transmitted based on a specific panel ID, thereby preventing the ambiguity on a UE operation.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates a slot structure of an NR frame to which a method proposed in the present disclosure is applicable.

FIG. 6 illustrates examples of a resource grid for each antenna port and numerology to which a method proposed in the present disclosure is applicable. system.

FIG. 8 illustrates an example of beamforming using SSB and CSI-RS.

FIG. 9 illustrates an example of a UL BM procedure using an SRS.

FIG. 10 is a flowchart showing an example of a UL BM procedure using the SRS.

FIG. 11 is a flowchart showing an example of an uplink transmission/reception operation to which a method proposed in the present disclosure is applicable.

FIGS. 12 and 13 illustrate multiple panels based on an RF switch applied to the present disclosure.

FIG. 14 illustrates an example of a signaling between UE and a BS to which a method proposed in the present disclosure is applicable.

FIG. 15 is a flowchart for describing a method of transmitting, by a UE, an uplink channel in a wireless communication system according to an embodiment of the present disclosure.

FIG. 16 is a flowchart for describing a method of receiving, by a BS, an uplink channel in a wireless communication system according to another embodiment of the present disclosure.

FIG. 17 illustrates a communication system 1 applied to the present disclosure.

FIG. 18 illustrates wireless devices applicable to the present disclosure.

FIG. 19 illustrates a signal process circuit for a transmission signal.

FIG. 20 illustrates another example of a wireless device applied to the present disclosure.

FIG. 21 illustrates a hand-held device applied to the present disclosure.

MODE FOR INVENTION

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

FIG. 7 illustrates physical channels and general signal transmission used in a 3GPP Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency region. By scaling a reference subcarrier spacing by an integer N, different numerologies can be defined.

Definition of Terms eLTE eNB: The eLTE eNB is the evolution of eNB that supports connectivity to EPC and NGC.

gNB: Anode which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, µ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| µ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding-frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s = 1/(\Delta f_{max} \cdot N_f)$, where $\Delta f_{max} = 480 \cdot 10^3$, and $N_f = 4096$ Downlink and uplink transmissions is constituted of a radio frame with a period of $T_f = (\Delta f_{max} N_f / 100) \cdot T_s = 10$ ms. Here, the radio frame is constituted of 10 subframes each of which has a period of $T_{sf} = (\Delta f_{max} N_f / 1000) \cdot T_s = 1$ ms In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA} = N_{TA} T_s$ earlier than the start of the downlink frame by the UE.

For numerology µ, slots are numbered in ascending order of $n_s^\mu \in \{0, \ldots, N_{subframe}^{slots,\mu} - 1\}$ in the subframe and in ascending order of $n_{s,f}^\mu \in \{0, \ldots, N_{frame}^{slots,\mu} - 1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| µ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu} N_{sc}^{RB}$ subcarriers on a frequency region, each subframe consisting of 14·2μ OFDM symbols, but the present disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 6 described below, one resource grid may be configured for each numerology μ and antenna port p.

FIG. 5 illustrates a slot structure of an NR frame to which a method described in the present disclosure is applicable.

The slot includes a plurality of symbols in the time domain. For example, in the case of the normal CP, one slot includes 7 symbols, but in the case of the extended CP, one slot includes 6 symbols. A carrier includes a plurality of subcarriers in the frequency region. The resource block (RB) is defined as a plurality of (e.g., 12) consecutive subcarriers in the frequency region. A bandwidth part (BWP) may be defined as a plurality of consecutive (P)RBs in the frequency region and may correspond to one numerology (e.g., SCS, CP length, etc.). The carrier may include a maximum of N (e.g., 5) BWPs. Data communication may be performed through an activated BWP, and only one BWP may be activated in one UE. In a resource grid, each element is referred to as a resource element (RE) and one complex symbol may be mapped.

FIG. 6 illustrates examples of a resource grid per antenna port and numerology to which a method proposed in the present disclosure is applicable.

Each element of the resource grid for the numerology μ and the antenna port p is called a resource element and is uniquely identified by an index pair (k,l), where k=0, ..., $N_{RB}^{\mu} N_{sc}^{RB} - 1$ is an index on a frequency region, and l=0, ..., $2^{\mu} N_{symb}^{(\mu)} - 1$ refers to a location of a symbol in a subframe. The index pair (k,l) is used to refer to a resource element in a slot, where l=0, ..., $N_{symb}^{\mu} - 1$.

The resource element (k,l) for the numerology μ and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency region.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency region for subcarrier spacing configuration μ.

The center of subcarrier 0 of common resource block 0 for the subcarrier spacing configuration μ coincides with 'point A'. A common resource block number $n_{CRB}^{\mu}$ in the frequency region and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB}=n_{PRB}+N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 7 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S701). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S702).

Meanwhile, when there is no radio resource first accessing the eNB or for signal transmission, the UE may perform a Random Access Procedure (RACH) to the eNB (S703 to S706). To this end, the UE may transmit a specific sequence to a preamble through a Physical Random Access Channel (PRACH) (S703 and S705) and receive a response message (Random Access Response (RAR) message) for the preamble through the PDCCH and a corresponding PDSCH. In the case of a contention based RACH, a Contention Resolution Procedure may be additionally performed (S706).

The UE that performs the above procedure may then perform PDCCH/PDSCH reception (S707) and Physical Uplink Shared Channel (PUSCH)/Physical Uplink Control Channel (PUCCH) transmission (S708) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

ABM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 8 illustrates an example of beamforming using a SSB and a CSI-RS.

As illustrated in FIG. 8, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

```
-- ASN1START
-- TAG-TCI-STATE-START
TCI-State ::=                SEQUENCE {
    tci-StateId                  TCI-StateId,
    qcl-Type1                    QCL-Info,
    qcl-Type2                    QCL-Info
    ...
}
QCL-Info ::=                 SEQUENCE {
    cell                             ServCellIndex
    bwp-Id                           BWP-Id
    referenceSignal                  CHOICE {
        csi-rs                           NZP-CSI-RS-ResourceId,
        ssb                              SSB-Index
    },
    qcl-Type                     ENUMERATED {typeA, typeB, typeC, typeD},
    ...
}
```

TABLE 5-continued

```
-- TAG-TCI-STATE-STOP
-- ASN1STOP
```

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed can be inferred from a channel over which another symbol on the same antenna port is conveyed. When properties of a channel over which a symbol on one antenna port is conveyed can be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

FIG. 9 illustrates an example of an UL BM procedure using a SRS.

More specifically, (a) of FIG. 9 illustrates an Rx beam determination procedure of a base station, and (a) of FIG. 9 illustrates a Tx beam sweeping procedure of a UE.

FIG. 10 is a flow chart illustrating an example of an UL BM procedure using a SRS.

The UE receives, from the base station, RRC signaling (e.g., SRS-Config IE) including (higher layer parameter) usage parameter set to 'beam management' in S1010.

Table 6 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 6

```
-- ASN1START
-- TAG-MAC-CELL-GROUP-CONFIG-START
SRS-Config ::=                          SEQUENCE {
    srs-ResourceSetToReleaseList            SEQUENCE (SIZE (1..maxNrofSRS-
ResourceSets)) OF SRS-ResourceSetId             OPTIONAL, -- Need N
    srs-ResourceSetToAddModList             SEQUENCE (SIZE (1..maxNrofSRS-
ResourceSets)) OF SRS-ResourceSet                OPTIONAL, -- Need N
    srs-ResourceToReleaseList               SEQUENCE (SIZE (1..maxNrofSRS-
Resources)) OF SRS-ResourceId                   OPTIONAL, -- Need N
    srs-ResourceToAddModList                SEQUENCE (SIZE (1..maxNrofSRS-
Resources)) OF SRS-Resource                     OPTIONAL, -- Need N
    tpc-Accumulation                        ENUMERATED {disabled}
    ...
}
SRS-ResourceSet ::=                     SEQUENCE {
    srs-ResourceSetId                       SRS-ResourceSetId,
    srs-ResourceIdList                      SEQUENCE (SIZE (1..maxNrofSRS-
ResourcesPerSet)) OF SRS-ResourceId             OPTIONAL, -- Cond Setup
    resourceType                            CHOICE {
        aperiodic                               SEQUENCE {
            aperiodicSRS-ResourceTrigger                INTEGER (1..maxNrofSRS-
TriggerStates-1),
            csi-RS                                      NZP-CSI-RS-ResourceId
            slotOffset                                  INTEGER (1..32)
            ...
        },
        semi-persistent                         SEQUENCE {
            associatedCSI-RS                            NZP-CSI-RS-ResourceId
            ...
        },
        periodic                                SEQUENCE{
            associatedCSI-RS                            NZP-CSI-RS-ResourceId
            ...
        }
    },
    usage ENUMERATED                        {beamManagement,
codebook, nonCodebook, antennaSwitching},
    alpha                                   Alpha
    p0                                      INTEGER (-202..24)
    pathlossReferenceRS                     CHOICE {
        ssb-Index                               SSB-Index,
        csi-RS-Index                            NZP-CSI-RS-ResourceId
SRS-SpatialRelationInfo ::=             SEQUENCE {
    servingCellId                           ServCellIndex
    referenceSignal                         CHOICE {
        ssb-Index                               SSB-Index,
        csi-RS-Index                            NZP-CSI-RS-ResourceId,
        srs                                     SEQUENCE {
            resourceId                              SRS-ResourceId,
            uplinkBWP                               BWP-Id
        }
    }
}
SRS-ResourceId ::=                      INTEGER (0..maxNrofSRS-Resources-1)
```

In Table 6, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config IE in S1020. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S1030.

More specifically, for P-SRS with 'SRS-ResourceConfigType' set to 'periodic':

i) if SRS-SpatialRelationInfo is set to 'SSB/PBCH,' the UE transmits the corresponding SRS resource with the same spatial domain transmission filter (or generated from the corresponding filter) as the spatial domain Rx filter used for the reception of the SSB/PBCH; or ii) if SRS-SpatialRelationInfo is set to 'CSI-RS,' the UE transmits the SRS resource with the same spatial domain transmission filter used for the reception of the periodic CSI-RS or SP CSI-RS; or iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to 'SP-SRS' or 'AP-SRS,' the beam determination and transmission operations may be applied similar to the above.

Additionally, the UE may receive or may not receive feedback for the SRS from the base station, as in the following three cases in S1040.

i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to (a) of FIG. 9 as the usage for the base station to select the Rx beam.

ii) The Spatial_Relation_Info may not be configured for all the SRS resources within the SRS resource set. In this case, the UE may perform transmission while freely changing SRS beams. That is, this case corresponds to (b) of FIG. 9 as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

FIG. 11 is a flowchart showing an example of an uplink transmission/reception operation to which a method proposed in the present disclosure may be applied.

Referring to FIG. 11, the eNB schedules uplink transmission such as the frequency/time resource, the transport layer, an uplink precoder, the MCS, etc., (S1110). In particular, the eNB may determine a beam for PUSCH transmission of the UE through the aforementioned operations.

The UE receives DCI for downlink scheduling (i.e., including scheduling information of the PUSCH) on the PDCCH (S1120).

DCI format 0_0 or 0_1 may be used for the uplink scheduling and in particular, DCI format 0_1 includes the following information.

Identifier for DCI formats, UL/Supplementary uplink (SUL) indicator, Bandwidth part indicator, Frequency region resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator In particular, configured SRS resources in an SRS resource set associated with higher layer parameter 'usage' may be indicated by an SRS resource indicator field. Further, 'spatialRelationInfo' may be configured for each SRS resource and a value of 'spatialRelationInfo' may be one of {CRI, SSB, and SRI}.

The UE transmits the uplink data to the eNB on the PUSCH (S1130).

When the UE detects a PDCCH including DCI format 0_0 or 0_1, the UE transmits the corresponding PUSCH according to the indication by the corresponding DCI.

Two transmission schemes, i.e., codebook based transmission and non-codebook based transmission are supported for PUSCH transmission:

i) When higher layer parameter txConfig' is set to 'codebook', the UE is configured to the codebook based transmission. On the contrary, when higher layer parameter txConfig' is set to 'nonCodebook', the UE is configured to the non-codebook based transmission.

When higher layer parameter 'txConfig' is not configured, the UE does not predict that the PUSCH is scheduled by DCI format 0_1. When the PUSCH is scheduled by DCI format 0_0, the PUSCH transmission is based on a single antenna port.

In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter 'nrofSRS-Ports'.

When higher layer parameter 'txConfig' set to 'codebook' is configured for the UE, at least one SRS resource is configured in the UE. An SRI indicated in slot n is associated with most recent transmission of the SRS resource identified by the SRI and here, the SRS resource precedes PDCCH (i.e., slot n) carrying the SRI.

ii) In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter 'srs-ResourceIndicator'. The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter 'usage' set to 'nonCodebook'. The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

The foregoing description (e.g., 3GPP system, frame structure, NR system) may be applied in combination with the methods proposed in the disclosure or may be added up to clarify the technical characteristics of the methods proposed in the disclosure. Further, the embodiments and/or methods described in the disclosure are differentiated solely for ease of description, and some components in any one method may be replaced, or combined with components of another method.

According to which resource region of a different layer, a different frequency, and a different time a resource region in which the same transport block (TB) is repeatedly transmitted in Multi Tx/Rx Point-Ultra Reliable Low Latency Communication (MTRP-URLLC) is, transmission and reception may be performed by a multiplexing scheme such as Spatial Division Multiplexing (SDM)/Frequency Division Multiplexing (FDM)/Time Division Multiplexing (TDM), respectively. In order to obtain a higher diversity gain, repeated transmission of the same TB may be performed by using two resource regions or more among the SDM, the FDM, and the TDM.

In this case, a configuration of a promise between the BS and the UE may be required with respect to how multiple TCI states indicted through a TCI field of single DCI are mapped to the different layer/different frequency/different time.

Hereinafter, matters related to a definition of a panel in the present disclosure will be described in detail.

The 'panel' referred to in the present disclosure may be based on at least one of the following definitions.

According to an embodiment, the 'panel' may be modified to one panel or multiple panels, or a 'panel group', and construed/applied. The panel may be related to specific characteristics (e.g., a timing advance (TA), a power control parameter, etc.). The multiple panels may be panels having a similarity/common value in terms of the specific characteristics.

According to an embodiment, the 'panel' may be modified, and construed/applied as 'one antenna port or multiple antenna ports', 'one uplink resource or multiple uplink resources', or 'antenna port group' or 'uplink resource group (or set)'. The antenna port or the uplink resource may be related to specific characteristics (e.g., a timing advance (TA), a power control parameter, etc.). The multiple antenna ports (uplink resources) may be antenna ports (uplink resources) having a similarity/common value in terms of the specific characteristics.

According to an embodiment, the 'panel' may be modified, and construed/applied as 'one beam or multiple beams' or 'at least one beam group (or set)'. The beam (beam group) may be related to specific characteristics (e.g., a timing advance (TA), a power control parameter, etc.). The multiple beams (beam groups) may be beams (beam groups) having a similarity/common value in terms of the specific characteristics.

According to an embodiment, the 'panel' may be defined as a unit for configuring the transmission beam/reception beam by the UE. For example, a 'Tx panel' may generate a plurality of candidate transmission beams in one panel, but may be defined as a unit capable of using only one beam among the transmission beams in transmission at a specific time (i.e., only a spatial relation information RS per Tx panel may be used for transmission of a specific uplink signal/channel).

According to an embodiment, the 'panel' may refer to as 'multiple (or at least one) antenna ports', 'antenna port group', or 'uplink resource group (or set)' in which uplink synchronization is common/similar. In this case, the 'panel' may be modified to, and construed/applied as a generalized expression 'Uplink Synchronization Unit (USU)'. Alternatively, the 'panel' may be modified to, and construed/applied as a generalized expression 'Uplink Transmission Entity (UTE)'.

Additionally, the 'uplink resource (or resource group)' may be modified, and construed/applied as a resource (or resource group (or set)) of Physical Uplink Shared Channel (PUSCH)/Physical Uplink Control Channel (PUCCH)/Sounding Reference Signal (SRS)/Physical Random Access channel (PRACH). On the contrary, the resource (resource group) of the PUSCH/PUCCH/SRS/PRACH may be construed/applied as 'uplink resource (or resource group)' based on the definition of the panel.

In the present disclosure, the 'antenna (or antenna port)' may represent a physical or logical antenna (or antenna port).

As described above, the 'panel' referred to in the present disclosure may be variously interpreted as 'group of a UE antenna element', group of a UE antenna port', 'group of a UE logical antenna', etc. Which physical/logical antennas or antenna ports are mapped to one panel may be variously altered according to a position/distance/correlation between the antennas, an RF configuration and/or antenna (port) virtualization scheme. Such a mapping process may vary depending on UE implementation scheme.

Further, the 'panel' referred to in the present disclosure may be modified, and interpreted/applied to 'a multiple panels' or 'panel group' (having similarity in a specific characteristic viewpoint).

Hereinafter, matters related to the implementation of multiple panels will be described.

In the implementation of a UE in a high frequency band, modeling of a UE having a multiple panels consisting of one or a plurality of antennas is being considered (e.g., bi-directional two panels in 3GPP UE antenna modeling). Various forms may be considered in implementing such a multi-panel. This is described below in detail with reference to FIGS. 12 and 13.

FIG. 12 and FIG. 13 illustrate an example of multi-panel based on an RF switch applied to the disclosure.

A multiple panels may be implemented based on an RF switch.

Referring to FIG. 12, only one panel may be activated at a time, and signal transmission may be impossible for a predetermined time during which the activated panel is changed (i.e., panel switching).

FIG. 13 illustrates a multiple panels according to different implementation schemes. Each panel may have an RF chain connected thereto so that it may be activated at any time. In this case, the time taken for panel switching may be zero or very short, and depending on the modem and power amplifier configuration, multiple panels may be simultaneously activated to transmit signals simultaneously (STxMP: simultaneous transmission across multi-panel).

In a UE having a multiple panels described above, the radio channel state may be different for each panel, and the RF/antenna configuration may be different for each panel. Therefore, a method for estimating a channel for each panel is required. In particular, 1) to measure uplink quality or manage uplink beams or 2) to measure downlink quality for each panel or manage downlink beams using channel reciprocity, the following procedure is required.

A procedure for transmitting one or a plurality of SRS resources for each panel (here, the plurality of SRS resources may be SRS resources transmitted on different beams within one panel or SRS resources repeatedly transmitted on the same beam).

For convenience of description below, a set of SRS resources transmitted based on the same usage and the same time domain behavior in the same panel is referred to as an SRS resource group. The usage may include at least one of beam management, antenna switching, codebook-based PUSCH, or non-codebook based PUSCH. The time-domain behavior may be an operation based on any one of aperiodic, semi-persistent, and periodic.

The SRS resource group may use the configuration for the SRS resource set supported in the Rel-15 NR system, as it is, or separately from the SRS resource set, one or more SRS resources (based on the same usage and time-domain behavior) may be configured as the SRS resource group. In relation to the same usage and time-domain behavior, in the case of Rel-15, a plurality of SRS resource sets may be configured only when the corresponding usage is beam management. It is defined that simultaneous transmission is impossible between SRS resources configured in the same SRS resource set, but simultaneous transmission is possible between the SRS resources belonging to different SRS resource sets.

When considering the panel implementation scheme and multi-panel simultaneous transmission as shown in FIG. 13, the concept described above in connection with the SRS resource set may be directly applied to the SRS resource group. When considering panel switching according to the panel implementation scheme according to FIG. 12, an SRS resource group may be defined separately from the SRS resource set.

As an example, by granting a specific ID to each SRS resource, resources having the same ID may be configured to belong to the same SRS resource group and resources having different IDs may also be configured to belong to different resource groups.

For example, when four SRS resource sets (e.g., RRC parameter usage is configured to 'BeamManagement') configured for a beam management (BM) usage are configured to the UE, each SRS resource set may be configured and/or defined to correspond to each panel of the UE. As an example, when four SRS resource sets are represented by SRS resource sets A, B, C, and D, and the UE implements a total of four (transmission) panels, each SRS resource set corresponds to one (transmission) panel to perform the SRS transmission.

As an example, it may be possible to implement the UE shown in Table 7 below.

TABLE 7

| Maximum number of SRS reousrce sets across all time domain behavior (periodic/semi-persistent/aperiodic) | Additional constraint on the maximum of SRS resource sets per supported time domain (periodic/semi-persistent/aperiodic) |
| --- | --- |
| 1 | 1 |
| 2 | 1 |
| 3 | 1 |
| 4 | 2 |
| 5 | 2 |
| 6 | 2 |
| 7 | 4 |
| 8 | 4 |

Referring to Table 7, when the UE reports (or transmits), to the BS, UE capability information in which the number of SRS resource sets supportable by the UE itself is 7 or 8, the corresponding UE may be configured with up to a total of four SRS resource sets (for the BM usage) from the BS. In this case, as an example, the UE may also be defined, configured, and/or indicated to perform uplink transmission by making each of the SRS resource sets (for the BM usage) correspond to each panel (transmission panel and/or reception panel) of the UE. That is, an SRS resource set(s) for a specific usage (e.g., BM usage) configured to the UE may be defined, configured, and/or indicated to correspond to the panel of the UE. As an example, when the BS (implicitly or explicitly) configures and/or indicates, to the UE, a first SRS resource set in relation to the uplink transmission (configured for the BM usage), the corresponding UE may recognize to perform the uplink transmission by using a panel related (or corresponding) to the first SRS resource set.

Further, like the UE, when the UE that supports four panels transmits each panel to correspond to one SRS resource set for the BM usage, information on the number of SRS resources configurable per SRS resource set may also be include in the capability information of the UE. Here, the number of SRS resources may correspond to the number of transmittable beams (e.g., uplink beams) per panel of the UE. For example, the UE in which four panels are implemented may be configured to perform the uplink transmission in such a manner that two uplink beams correspond to two configured RS resources, respectively for each panel.

In relation to the multi-panel transmission, UE category information may be defined in order for the UE to report capability information thereof, which is related to the multi-panel transmission. As an example, three multi-panel UE (MPUE) categories may be defined, and three MPUE categories may be classified according to whether multiple panels may be activated and/or whether transmission using multiple panels is possible.

In the case of MPUE category 1, in a UE in which multiple panels are implemented, only one panel may be activated once and a delay for panel switching and/or activation may be configured to [X] ms. As an example, the delay may be configured to be longer than a delay for beam switching/activation, and may be configured in units of symbol or slot.

In the case of MPUE category 2, in the UE in which multiple panels are implemented, multiple panels may be activated once and one or more panels may be used for transmission. That is, in MPUE category 2, simultaneous transmission using the panels may be possible.

In the case of MPUE category 3, in the UE in which multiple panels are implemented, multiple panels may be activated once, but only one panel may be used for transmission.

In relation to the multi panel based signal and/or channel transmission/reception proposed in the present disclosure, at least one of three MPUE categories described above may be supported. As an example, in Rel-16, MPUE category 3 among three following MPUE categories may be (optionally) supported.

Further, information on the MPUE category may be pre-defined on a specification (i.e., standard), or may also be semi-statically configured and/or dynamically indicated according to a situation on a system (i.e., a network aspect or a UE aspect. In this case, a configuration/indication related to the multi panel based signal and/or channel transmission/reception may be configured/indicated by considering the MPUE category.

Hereinafter, matters related to a configuration/indication related to panel-specific transmission/reception will be described.

In relation to a multi panel based operation, transmission/reception of a signal and/or a channel may be performed to be panel specific. Here, panel-specific may mean that the transmission of the signal and/or channel in units of panel may be performed. Panel-specific transmission/reception may also be referred to as panel-selective transmission/reception.

In the panel-specific transmission/reception in the multi panel based operation proposed in the present disclosure, a scheme of using identification information (e.g., an identifier, an indicator, etc.) for indicating a panel to be used for transmission/reception among one or more panels may be considered.

As an example, an ID for the panel may be used for panel selective transmission of PUSCH, PUCCH, SRS, and/or PRACH among multiple activated panels. The ID may be configured/defined based on at least any one of fourth following schemes (Alts. 1, 2, 3, and 4).

Alt.1: The ID for the panel may be an SRS resource set ID.

As an example, when aspects according to clauses a) to c) below are considered, each UE Tx panel may preferably correspond to an SRS resource set configured in an aspect of UE implementation.
  a) SRS resources of multiple SRS resource sets having the same time domain operation in the same bandwidth part (BWP) are simultaneously transmitted
  b) the power control parameter is configured in units of SRS resource set
  c) the UE reports a maximum of four SRS resource sets (which may correspond to a maximum of four panels) according to a supported time domain operation In the case of scheme Alt.1, the SRS resource set related to each panel may be used for 'codebook' and 'non-codebook' based PUSCH transmission. Further, multiple SRS resources which belong to multiple SRS resource sets may be selected by extending the SRI field of the DCI. A mapping table between the sounding reference signal resource indicator (SRS) and the SRS resource may be required to be extended to include the SRS resource in the entire SRS resource set.

Alt.2: The ID for the panel may be an ID (directly) associated with a reference RS resource and/or a reference RS resource set.

Alt.3: The ID for the panel may be an ID directly associated with a target RS resource and/or a target RS resource set.

Scheme Alt.3 has an advantage in that a configured SRS resource set(s) corresponding to one UE Tx panel may be more easily controlled, and the same panel identifier may be allocated to multiple SRS resource sets having different time domain operations.

Alt.4: The ID for the panel may be an ID additionally configured in spatial relation info (e.g., RRC_SpatialRelationInfo).

Scheme Alt.4 may be a scheme of newly adding information for representing the ID for the panel. In this case, there is an advantage in that a configured SRS resource set(s) corresponding to one UE Tx panel may be more easily controlled, and the same panel identifier may be allocated to multiple SRS resource sets having different time domain operations.

As an example, a method for introducing UL TCI similarly to the existing DL Transmission Configuration Indication (TCI) may be considered. Specifically, a UL TCI state definition may include a list of reference RS resources) (e.g., SRS, CSI-RS, and/or SSB). A current SRI field may be reused for selecting a UL TCI state from the configured set. Alternatively a new DCI field (e.g., UL-TCI field) of DCI format 0_1 may be defined for a purpose of indicating the UL TCI state.

The panel specific transmission/reception related information (e.g., panel ID., etc.) may be transferred through higher layer signaling (e.g., RRC message, MAC-CE, etc.) and/or lower layer signaling (e.g., L1 signaling, DCI, etc.). The corresponding information may be transferred from the BS to the UE or from the UE to the BS according to a situation or as necessary.

Further, the corresponding information may also be configured by a hierarchical scheme of configuring a set for a candidate group and indicating specific information.

Further, the panel related identification information may be configured in units of a single panel unit or in units of multiple panels (e.g., a panel group and a panel set).

Hereinafter, contents related to a multiplexing/piggyback operation of uplink control information (UCI) will be described.

A procedure for reporting control information by the UE may be performed as follows.

When a secondary cell group (SCG) is configured in the UE, the UE performs an operation for applying a procedure described below to both a master cell group (MCG) and a secondary cell group (SCG).

When the procedure is applied to the master cell group (MCG), terms 'secondary cell', 'secondary cells', 'serving cell', and 'serving cells' mean 'secondary cell', 'secondary cells', 'serving cell', and 'serving cells' which belong to the master cell group (MCG), respectively.

When the procedure is applied to the secondary cell group (SCG), terms 'secondary cell', 'secondary cells (not including PSCell)', 'serving cell', and 'serving cells' mean 'secondary cell', 'secondary cells (not including PSCell)', 'serving cell', and 'serving cells' which belong to the secondary cell group (SCG), respectively. Term primary cell means a primary secondary cell (PSCell) of the secondary cell group (SCG).

When PUCCH-Scell is configured in the UE, the UE should apply a procedure described below to a primary PUCCH group and a secondary PUCCH group.

When the procedure is applied to the primary PUCCH group, terms 'secondary cell', 'secondary cells', 'serving cell', and 'serving cells' mean 'secondary cell', 'secondary cells', 'serving cell', and 'serving cells' which belong to the primary PUCCH group, respectively.

When the procedure is applied to the secondary PUCCH group, terms 'secondary cell', 'secondary cells (not including PUCCH-SCell)', 'serving cell', and 'serving cells' mean 'secondary cell', 'secondary cells (not including PUCCH-SCell)', 'serving cell', and 'serving cells' which belong to the secondary cell group (SCG) which belong to the secondary PUCCH group, respectively. Term primary cell means PUCCH-SCell of the secondary PUCCH group.

When the UE transmits a PUSCH without UL-SCH which is overlapped with PUCCH transmission in the serving cell including positive SR information in the corresponding serving cell, the UE does not transmit the corresponding PUSCH.

When the UE transmits a CSI report for the overlapped physical channels, the UE applies a priority rule (e.g., TS 38.214) described for multiplexing of the CSI report.

When the UE has redundant resources for PUCCH transmission in a slot and transmission of at least one PUCCH is repeated through multiple slots, the UE first follows a procedure (e.g., Clause 9.2.6 of TS 38.213) described to solve overlapping between the resources for the PUCCH transmission.

If the UE,
  multiplexes the UCI in the PUCCH transmission overlapped with the PUSCH transmission and
  PUSCH transmission and PUCCH transmission satisfy a condition (e.g., Clause 9.2.5 of TS 38.213) for UCI multiplexing,
  the UE may operate as follows.
  If there is only HARQ-ACK information in the UCI in the PUSCH transmission, the UE multiplexes the UCI and if the UE multiplexes an aperiodic or semi-persistent CSI report in the PUSCH, the UE does not transmit the PUCCH.
  If there is only HARQ-ACK information and the CSI report in the UCI in the PUSCH transmission, the UE multiplexes the UCI and if the UE does not multiplex an aperiodic or semi-static CSI report in the PUSCH, the UE does not transmit the PUCCH.

In the case of $\mu_1<\mu_2$, the UE does not expect multiplexing in the PUSCH transmission in one slot having SCS configuration UCI of the same type as being transmitted to the PUCCH in another slot having SCS configuration $\mu_2$.

The UE schedules PDSCH reception or SPS PDSCH release, and does not expect to detect a DCI format indicating a resource for the PUDSCCH transmission having corresponding HARQ-ACK information in one slot. In this case, it is premised that the UE previously detects a DCI format for scheduling the PUSCH transmission in one slot and multiplexes the HARQ-ACK information when transmitting the PUSCH.

When the UE multiplexes aperiodic CSI in the PUSCH, the UE multiplexes the UCI including the HARQ-ACK information in the PUCCH overlapped with the PUSCH, and a timing condition (e.g., Clause 9.2.5 of TS 38.213) for PUCCHs and PUSCHs overlapped is satisfied, the UE multiplexes only the HARQ-ACK information in the PUSCH and does not transmit the PUCCH.

The UE transmits multiple PUSCHs in the slot on each serving cell including first PUSCHs scheduled by DCI format 0_0 and DCI format 0_1, and second PUSCHs configured by each of ConfiguredGrantConfig or semiPersistentOnPUSCH, the UE multiplexes the UCI in one of multiple PUSCHs, and multiple PUSCHs satisfy a condition (e.g., Clause 9.2.5 of TS 38.213) for UCI multiplexing, the UE multiplexes the UCI in the PUSCH of the first PUSCHs.

When the UE transmits multiple PUSCHs in the slot on each serving cell, multiplexes the UCI in one of multiple PUSCHs, and the UE does not multiplex aperiodic CSI even in any one of multiple PUSCHs, the UE multiplexes the UCI in a PUSCH of a serving cell having smallest ServCellIndex in which the UCI multiplexing condition is satisfied.

When the UE transmits one or more PUSCHs in the slot of the serving cell having the smallest ServCellIndex satisfying the condition for the UCI multiplexing, the UE multiplexes the UCI in an earliest PUSCH which the corresponding UE transmits in the slot.

When the UE transmits the PUSCH through multiple slots, the UE transmits a PUCCH having HARQ-ACK and/or CSI information in a single slot and a slot overlapped with the PUSCH transmission in one or more slots among multiple slots, and the PUSCH transmission in one or more slots satisfies a condition for multiplexing the HARQ-ACK and/or CSI information, the UE multiplexes the HARQ-ACK and/or CSI information in the PUSCH transmission of one or more slots.

When the UE does not transmit a single slot PUCCH having the HARQ-ACK and/or CSI information in a slot without the PUSCH transmission, the UE does not multiplex the HARQ-ACK and/or CSI information in the PUSCH transmission in one slot among multiple slots.

When PUSCH transmission for multiple slots is scheduled by DCI format 0_1, the same value of a DAI field may be applied in order for the UE to multiplex the HARQ-ACK information upon the PUSCH transmission in any one slot among multiple slots multiplexing the HARQ-ACK information.

0 as an HARQ-ACK information bit value indicates negative acknowledgement (NACK) and 1 as the HARQ-ACK information bit value indicates positive acknowledgement (ACK).

Various rules may be defined so as to transmit uplink signal(s)/channel(s) of a limited number (e.g., 1 or 2) per component carrier (CC)/band to any UE. Here, the 'band' may be defined by giving a band number as a consecutive frequency range in which an LTE or NR system may be implemented by considering frequency allocation for each usage in the ITU and each country. A multi-carrier related operation such as carrier aggregation (CA)/dual connectivity (DC) may be performed in addition to a single CC based operation by allocating/configuring one or multiple component carriers (CC) in one band for each communication operator of each country. A CA operation among multiple component carriers in one band is referred to as intra-band CA and a CA operation among multiple component carriers which belong to different bands is referred to as inter-band CA.

In a mobile communication system, when multiple uplink signal(s)/channel(s) are indicated/configured to be transmitted to the same set within one component carrier/bandwidth part (CC/BWP), a collision handling rule is defined so as to prevent remaining signals/channels other than one uplink signal/channel from being transmitted by considering UE Tx power (e.g., Clause 6.2.1.3 of TS 38.214). An example of the collision handling rule is as follows.

drop UL signals/channels except for one UL signal/channel drop UL signals/channels except for one UL signal/channel and piggyback (a part of) the information on the dropped UL channel(s) to the UL channel to be transmitted Exceptionally, a case where simultaneous transmission is permitted within the same component carrier/bandwidth part (CC/BWP) for a combination of some uplink signal(s)/channel(s) (according to the UE capability) may be defined (e.g., simultaneous transmission of PUCCH and PUSCH in LTE Rel-10+).

Upon a multi-carrier operation such as CA/DC, whether simultaneous transmission will be permitted between the uplink signal(s)/channel(s) which belongs to different component carriers(CCs)/bands or whether to apply the collision handling rule may be defined according to the UE capability (e.g., RF configuration related UE capability) (e.g., [6.2.1.3, TS38.214][4.2.7.4 TS38.306]).

If different CCs are implemented with different RF chains (and antennas) in the UE, there is no problem in that the different CCs are simultaneously transmitted. However, if the different CCs are implemented with the same RF chain (and antenna), a problem in that the power should be divided and used upon simultaneous transmission and/or a problem in that a component such as a bandpass filter is complicated and implementation cost may thus increase may occur. Accordingly, the simultaneous transmission may not be performed. However, an actual implementation of the UE and the UE capability does not particularly correspond to each other.

Hereinafter, in the present disclosure, for convenience of description, term 'component carrier set (CC set)' will be defined. Here, the component carrier (CC) set may be defined as a combination of CCs to which the collision handling rule is applied (to a combination of a specific uplink signal(s)/channel(s).

That is, when there are multiple uplink signals/channels configured/indicated to be transmitted to the same symbol position, the collision handling rule is applied within the component carrier (CC) set (for the combination of the corresponding uplink signals/channels). The collision handling rule may not be applied to the uplink signals/channels configured/indicated to be transmitted in different component carrier sets (i.e., simultaneous transmission is permitted).

The component carrier (CC) set (to be applied to a specific UL signal/channel combination may be determined by related UE capability report. Alternatively, the component carrier (CC) set may be based on information (information configured through higher layer signaling (e.g., RRC signaling)) configured by the BS.

Here, the component carrier (CC) set may vary depending on the combination of the uplink signal/channel. For example, when PUCCHs, PUSCHs, or PUSCH and PUCCH are configured/indicated in the same symbol, various rules are defined, which is to transmit only one uplink channel in the master cell group (MCG) or secondary cell group (SCG) by piggybacking the UCI to a specific uplink channel for CCs in the MCG or SCG regardless of the UE capability as described above.

As described above, in the current system, whether to permit simultaneous transmission is defined within the same component carrier/bandwidth part (CC/BWP) and/or for different CCs (i.e., whether to apply the collision handling rule), and when the UE is mounted with multiple Tx panels, there may be a problem in applying the rule as it is. In particular, there may be UE which may perform the simultaneous transmission through multiple Tx panels. In the case of the corresponding UE, since at least one RF chain is to be separately implemented for each panel, there may be no problem in transmitting multiple uplink signals/channels by using different panels even in the single CC.

Accordingly, a predefined rule needs to be changed for the UE. Further, even in the multi-CC based operation, panel implementation may be identical with respect to multiple CCs according to the UE or not identical. Whether to permit simultaneous transmission of multiple UL signals/channels according to panel configuration information of each CC and whether to apply the same panel between the CCs needs to be redefined.

Based on the reviewed contents, the present disclosure proposes methods related to transmission and reception of signals/channels based on multiple panels by considering the single/multi-CC/band operation.

Hereinafter, techniques/methods proposed in the present disclosure are just distinguished for convenience and it is needless to say that some components of any technique/method may be substituted with components of another technique/method or may be applied in combination with each other.

Hereinafter, matters related to multi-panel related UE capability reporting by considering the multi-CC based operation will be described.

An operation of permitting simultaneous transmission or applying the collision handling rule between uplink signal(s)/channel(s) which belongs to the same or different component carriers/bands (CC/band) upon the multi-carrier operation such as the single carrier or CA/DC as described above may be considered. With respect to the corresponding operation, a solution method for multi-panel transmission/reception of the UE should be additionally considered.

That is, a process is required in which the UE reports, to the BS/network, panel implementation/configuration related information (i.e., multi-panel related UE capability) thereof, so hereinafter, a method for reporting the multi-panel related UE capability considering the single/multi-CC based operation (hereinafter, referred to as Proposal 1) will be described in detail.

[Proposal 1]

The UE may report, to the BS, (Tx/Rx) Panel related configuration/information for the multi-CC/band based operation as the UE capability.

Specifically, the UE may report, to the BS, at least one of i) or ii) below as the UE capability.

i) Information regarding whether Tx panel configurations which belong to different component carriers/bands (CC/band) are identical and/or a range of component carriers/bands (CCs/bands) in which (each) Tx panel related information is valid ii) Information regarding whether Rx panel configurations which belong to different component carriers/bands (CC/band) are identical and/or a range of component carriers/bands (CCs/bands) in which (each) Rx panel related information is valid The 'whether the Tx/Rx panel configurations are identical' may be reported in the following form.

According to an embodiment, panel information (e.g., the number of panels, the number of antenna ports per panel, and the maximum number of beams generable per panel (e.g., number of SRS resources)) may be reported, which is to be commonly applied to specific (adjacent) CC/band indexes.

According to an embodiment, panel information for each CC/band index (group) may be reported.

In the case where the UE reports the same panel information to multiple specific (adjacent) CC/band indexes (groups), the case may implicitly mean that the corresponding CC/band indexes (groups) is implemented as the same panel (i.e., common RF structure).

The 'the range of the component carriers/bands (CCs/bands) in which the Tx/Rx panel related information is valid' may be reported in the following form. According to an embodiment, the UE may report the panel information for the specific CC/band index (group) and jointly report (adjacent/neighboring) CC/band index(es) (group(s)) to which the corresponding information is to be equally applied.

Options 1-1/1-2/1-3 described below are methods which may be additionally applied to Proposal 1 above. The corresponding options are just distinguished for convenience of description, and one or more options may also be applied in combination with each other, of course.

When the reporting is performed in units of band, the BS and/or the UE may assume that the Tx panel and/or Rx panel configurations are identical with respect to multiple component carriers which belong to the same band (multiple intra-band CCs).

[Option 1-1]

The UE may report whether panel-level correspondence (i.e., panel-level reciprocity) is established in units of component carrier(s) (or component carrier group) or in units of band(s) (or band group).

Whether the panel-level correspondence is established may mean whether (specific or all) Tx panel ID(s) may be used as a substitute for whether (specific or all) Rx panel ID(s) and/or whether (specific or all) Rx panel ID(s) may be used as a substitute for whether (specific or all) Tx panel ID(s). Accordingly, if the panel-level correspondence is defined for all panels, the Tx panel ID and the Rx panel DI may match one to one (as the same ID).

When the panel-level correspondence is established, the UE may report only one of the Rx panel configuration information or the Tx panel configuration information (for the corresponding CC(s)/band(s)). When the panel-level correspondence is not established, the UE may report both the Rx panel configuration information or the Tx panel configuration information (for the corresponding CC(s)/band(s)).

When the panel-level correspondence is established, the BS may assume that another Rx or Tx panel configuration information other than the Tx or Rx panel configuration information included in the UE capability information reported by the UE is the same as Tx or Rx panel configuration information included in the UE capability information.

The UE may report whether the beam correspondence is established (for each panel) in addition to the panel-level correspondence. Here, a case where 'the beam correspondence is established for a specific panel' may mean that (all) Tx beams and Rx beams generated in the corresponding panel match one to one.

Hereinafter, specific embodiments based on Proposal 1 above will be described.

The panel information may include information on at least one of the total number of panels, the total number of antenna ports per panel, and the maximum number of beams generable (or required) per panel.

The total number of panels may be based on the required number of SRS resource sets/groups for BM with same time domain behavior) or the required number of panel IDs. The maximum number of beams generable (or required) per panel may be based on the number of SRS resources per SRS resource set/group.

The UE capability information may be reported in forms described in Examples 1 to 4 below.

Example 1) panel-level correspondence=yes, 2 Tx panels for CC #0~CC #4, 4 Tx panels for CC #5~CC #9, Since the panel-level correspondence is established, the BS receiving the UE capability information may determine the capability of the corresponding UE as 2 Rx panels for CC #0 to CC #4, 4 Rx panels for CC #5 to CC #9 and perform the resulting subsequent operation.

Example 2) panel-level correspondence for CC #0~CC #4=yes, 2 Tx panels for CC #0~CC #4, panel-level correspondence for CC #5~CC #9=no, 4 Tx panels for CC #5~CC #9, 3 Rx panels for CC #5~CC #9

Since the panel-level correspondence is established, the BS receiving the UE capability information may determine the capability of the corresponding UE as 2 Rx panels for CC #0 to CC #4 and perform the resulting subsequent operation.

Example 3) 2 Tx panels for band #0, 4 Tx panels for band #1

The BS receiving the UE capability information may have no information on the Rx panel of the corresponding UE.

Example 4) 1st Tx panel operates for CC #0~CC #9, 2nd Tx panel operates for CC #5~CC #9

The BS receiving the UE capability information may have no information on the Rx panel of the corresponding UE.
[Option 1-2]

The BS receiving the UE capability information based on Proposal 1 may indicate the Tx panel (and/or Rx panel) to the corresponding UE as follows.

The BS may use Tx panel (and/or Rx panel) information for another CC within the range in which the panel information is valid in performing the Tx panel (and/or Rx panel) indication/configuration for a specific CC.

The 'range in which the panel information is valid' may be based on the UE capability information of Proposal 1. Specifically, the 'range in which the panel information is valid' may be based on at least one information of 'whether the Tx/Rx panel configuration is identical', 'CC(s)/band(s) in which the Tx/Rx panel configuration is identical', or 'range of CCs/bands in which the Tx/Rx panel related information is valid (and/or CC/band group)'.

Alternatively, the 'range in which the panel information is valid' may be based on information configured by the BS. In this case, the BS may explicitly configure a range of CCs/bands which may be indicted/reported by sharing the panel ID for multiple CCs (and/or CC(s)/band(s) which belong(s) to the CC/band group) (through the RRC).

The indication of the Tx panel and/or Rx panel may be performed as in Examples 1 to 4 below. For convenience of description, it is assumed that CC #0 to CC #4 are the same panel configuration in Examples 1 to 4 below.

Example 1) The BS may use the resource (RS) index (or Tx panel ID) transmitted to (the) specific Tx panel by the UE in CC #4 for a transmission indication through the specific Tx panel for CC #0. For example, an index of a reference signal (resource) transmitted through the Tx panel used by the UE in CC #4 (or TX panel ID or Tx panel related information) may be included in information (e.g., RRC/MAC-CE/DCI) indicating uplink transmission (e.g., PUCCH/PUSCH/SRS/PRACH, etc.) using/based on the corresponding Tx panel in CC #0.

Example 2) The BS may use a specific Rx panel ID which the UE reports (prefers to in specific downlink reference signal (DL RS) reception) in CC #4 for a transmission indication through the specific Tx panel for CC #0. This may be applied only to the case where the panel-level correspondence is established (panel-level correspondence=yes).

Example 3) The BS may use a specific Rx panel ID which the UE reports (prefers to in specific downlink reference signal (DL RS) reception) in CC #4 for a reception indication through the specific Rx panel for CC #0.

Example 4) The BS may use an index of a reference signal (resource) which the UE transmits to a specific Tx panel (or Tx panel ID) in CC #4 for a reception indication through the specific Tx panel for CC #0. This may be applied only to the case where the panel-level correspondence is established (panel-level correspondence=yes).
[Option 1-3]

The BS receiving the UE capability information of Proposal 1 may indicate/configure the Tx panels (and/or Rx panels) for multiple specific CCs within the valid range of the panel information to be changed at once. In this case, UE in which a specific event (e.g., beam failure, initial access, random access) occurs may assume that the Tx panels (and/or Rx panels) for multiple specific CCs within the valid range of the panel information is changed/configured at once.

Example) when a beam failure for a specific CC occurs, the UE may operate as follows.

The UE may transmit an uplink channel (e.g., a PRACH or PUCCH for a usage of a beam failure recovery request) for informing the BS of the occurrence of the corresponding event through a specific panel (e.g., Tx panel).

In this case, the UE may transmit (receive) a subsequent signal/channel by using the specific panel (and/or a panel (e.g., Rx panel) having a panel correspondence to the corresponding panel (e.g., Tx panel) (after a specific timing) even for other CCs (e.g., specific CCs within the valid range of the panel information) using the same panel as the specific CC.
[Proposal 1-1]

The UE may report the UE capability information as follows for a combination/range of each CC(s)/band(s) related to the panel information.

The UE may report whether multiple panels may be simultaneously activated and/or whether multiple panels may be simultaneously used for UL transmission of a specific uplink signal(s)/channel(s) (as the UE capability). As an example, the UE capability information may be classified into one or more multi-panel UE categories. The UE may be configured to report the corresponding information by using an index/indicator assigned/mapped to the multi-panel UE category.

The 'activated panel' means that the corresponding panel may be used for transmission (and reception) anytime (or without a delay).

As an example, the 'combination/range of the CC(s)/band(s)' may be based on the CCs in the band (intra-band CCs). As another example, the 'combination/range of the CC(s)/band(s)' may be based on the CCs between the bands (in a specific band combination) in the band (intra-band CCs).

Hereinafter, matters related to simultaneous transmission of uplink signals/channels considering the multi-CC based operation will be described.

Specifically, when transmission of uplink signals/channels (UL signals/channels) is configured/indicated in the same symbol (or slot) for multiple UEs (by utilizing the UE capability information of Proposal 1 above), methods related to permission/limitation of simultaneous transmission will be described below in Proposals 2 and 3.

According to an embodiment, the 'range of the CC/band in which the panel information is valid' related to the UE capability information of Proposal 1 above may be changed to, and construed/applied as the 'range of the CC/band in which simultaneous transmission is limited'.

[Proposal 2]

When the total number of panels which may be simultaneously transmitted by the UE is X, the collision handling rule may be applied to the uplink signals/channels configured/indicated to be transmitted at the same symbol position as follows.

When there are multiple uplink signals/channels configured/indicated to be transmitted at the same symbol position within the component carrier (CC) set (i.e. when multiple signals/channels collide with each other), grouping may be performed based on a UL panel ID. Specifically, the grouping may be performed based on the UL panel ID assigned/configured to the uplink signals/channels configured/indicated to be transmitted at the same symbol position.

The collision handling rule may be preferentially applied (to combinations other than the uplink signal/channel combination in which simultaneous transmission is permitted) within the same component carrier (CC) set in each uplink signal/channel group (i.e., collision handling within a panel). Through this, the UE may determine the uplink signal(s)/channel(s) to be transmitted by using each UL panel ID (a UL panel corresponding to each UL panel ID).

In this case, the uplink signal(s)/channel(s) to be transmitted may be the uplink signal(s)/channel based on the uplink signal/channel combination in which simultaneous transmission is permitted in the component carrier (CC) set.

When the total number of UL panel IDs corresponding to the determined uplink signal(s)/channel)(s) is more than Y, the collision handling rule may be additionally applied as follows. Specifically, the collision handling rule may be additionally applied according to the priority of the corresponding signal/channel and/or information transferred in the corresponding uplink channel for the uplink signal(s)/channel(s) for each UL panel ID (i.e., collision handling across multiple panels).

As an example, the Y value may fixed to a value which is the same as the X value.

As another example, the Y value may be based on a value configured by the BS.

As another example, the Y value may determine according to a rule that uses all or only some of X panels (Y≤X).

The rule may be a rule based on at least one of 1) to 5) below.

1) Transmission power for each panel required for the corresponding transmission
2) Power headroom
3) Maximum transmission power (applied according to a requirement such as maximum permissible exposure (MPE), etc.) (Pc_max)
4) Power saving mode related configuration
5) Type/priority of corresponding uplink signal(s)/channel(s)

A specific embodiment related to the rule is described in Examples 1 to 3 below.

Example 1) all/specific signal corresponding to a panel having largest required transmission power is not transmitted Example 2) Even in the case of X>1, when a collision with the PRACH occurs, other UL channels/signals other than the PRACH are not transmitted (even through other panels)

Example 3) Even in the case of X>1, simultaneous transmission of multiple panels in the PUCCH and the PUCCH is not permitted and multiple panels are transmitted to one PUCCH through UCI multiplexing.

In this case, in the case of the UE capable of using only a single panel for uplink transmission, X=Y=1 may be established.

In applying Proposal 2 above, the UCI piggyback/multiplexing rule may be preferably applied to a case of redundancy of each of PUCCHs, PUSCHs, and the PUCCH and the PUSCH, and then the methods may be applied to the redundancy case (for the CCs within the MCG or SCG).

[Proposal 3]

When there may be multiple uplink signals/channels configured/indicated to be transmitted to the same symbol position within the single C or within the single component carrier (CC) set, and the UE may operate as follows in relation to whether corresponding multiple uplink signals/channels are simultaneously transmitted.

When there is an uplink combination in which simultaneous transmission is permitted within the same component carrier (CC) set (according to the UE capability) (e.g., after NR further Release, PUCCH+PUSCH in LTE Rel-10), if the UL panel IDs assigned/configured to the corresponding uplink signal(s)/channel(s) are identical, the UE may perform simultaneous transmission and if the UL panel IDs are different, the UE may operate according to one of Options 3-1 and Option 3-2 below.

[Option 3-1]

The UE may disregard a UL panel ID indicated/configured to a specific uplink signal/channel, and transmit the corresponding signal/channel by using a UL panel ID (a UL panel corresponding to the UL panel ID) for another specific uplink signal/channel where the collision occurs.

Embodiment 1) Based on at least one of a priority of the uplink signal/channel or a priority of information transmitted to the corresponding uplink channel, the UE may transmit the corresponding signal/channel by using a UL panel ID (a UL panel corresponding to the UL panel ID) corresponding to a corresponding uplink signal/channel having a high priority. Alternatively, based on at least one of the priority of the uplink signal/channel or a priority of information transmitted to the corresponding uplink channel, the UE may transmit the uplink signal/channel by using a UL panel ID (a UL panel corresponding to the UL panel ID) corresponding/related to a corresponding uplink signal/channel having a high priority.

Embodiment 2) The UE may transmit the corresponding uplink signal/channel by using a UL panel ID (a UL panel corresponding to the UL panel ID) corresponding to an uplink signal/channel having a largest power headroom. Alternatively, the UE may transmit the corresponding uplink signal/channel by using a UL panel ID (a UL panel corresponding to the UL panel ID) corresponding/related to the uplink signal/channel having the largest power headroom.

Embodiment 3) The UE may transmit the corresponding uplink signal/channel by using a UL panel ID (a UL panel corresponding to the UL panel ID) corresponding to an uplink signal/channel having lowest transmission power (Pc). Alternatively, the UE may transmit the corresponding uplink signal/channel by using a UL panel ID (a UL panel corresponding to the UL panel ID) corresponding/related to an uplink signal/channel having a lowest transmission power/uplink power control parameter (P_c).

Embodiment 4) The UE may transmit the corresponding uplink signal/channel by using a UL panel ID (a UL panel corresponding to the UL panel ID) corresponding to an uplink signal/channel having highest transmission power (Pc). Alternatively, the UE may transmit the corresponding uplink signal/channel by using a UL panel ID (a UL panel corresponding to the UL panel ID) corresponding/related to an uplink signal/channel having a highest transmission power/uplink power control parameter (P_c).

[Option 3-2]

The UE may not transmit a specific uplink signal/channel (i.e., dropping). In this case, the UE may be configured to transmit (piggyback) (some of) information to be transmitted through an uplink channel which is not transmitted through another uplink channel in which the collision occurs or perform transmission after a corresponding timing (through another UL channel).

Embodiment 1) Based on at least one of a priority of the uplink signal/channel or a priority of information transmitted to the corresponding uplink channel, the UE may transmit only a corresponding uplink signal/channel having a high priority and drop another uplink signal/channel.

The rule for the priority of the uplink signal/channel and/or the information transmitted to the corresponding uplink channel mentioned in Proposals 2 and 3 may be further subdivided and determined based on a type/format of corresponding uplink signal/channel, a triggering method for the uplink signal/channel, a usage of the corresponding uplink signal/channel, etc.

As an example, in the case of the PRACH, the priority may be determined separately for a contention-based PRACH and a non-contention based PRACH. And/or priority rules may be defined, which are subdivided according to the usage/triggering method, such as a PRACH for a beam failure recovery request (BFRQ), a PRACH for a scheduling request, a PRACH for an initial access, a PDCCH ordered PRACH, etc.

As another example, in the case of the SRS, the priority may be determined separately for an aperiodic SRS, a periodic SRS, and a semi-persistent SRS. And/or, the priority may be determined based on the usage of the SRS (e.g., SRS usage='beam management', 'antenna switching, 'codebook-based UL', 'non-codebook based UL').

As yet another example, in the case of the PUCCH, the priority may be determined based on the usage of the PUCCH (ACK/NACK, scheduling request, CSI reporting, etc.). And/or, the priority may be determined based on the PUCCH format.

As still yet another example, in the case of the PUSCH, the priority may be determined according to whether the PUSCH is a semi-persistent scheduled PUSCH (i.e., aperiodically scheduled PUSCH). And/or, subdivided priorities may be prescribed based on the usage of the corresponding PUSCH (e.g., a PUSCH transmitting message 3 during an initial access process, a PUSCH transferring beam information during a BFR process, a PUSCH for a usage of aperiodic CSI reporting, a PUSCH for a usage of semi-persistent CSI reporting, and a PUSCH transmitting the transport block and/or the UCI).

Further, the 'panel' referred to in the present disclosure may be construed as a 'unit (or antenna group) capable of independently generating the uplink beam' (in addition to the definition of the panel described above). From such a viewpoint, in the methods proposed in the present disclosure, the concept may be changed/extended, and applied as 'Tx beam' instead of 'Tx panel'. In particular, the 'number of panels which may be simultaneously transmitted' in Proposal 1/2/3 may be changed and applied to the 'number of beams which may be simultaneously transmitted' and 'panel ID' may be changed and applied to 'beam ID'. In this case, 'Tx beam ID' may be construed as 'spatial relation RS' in the NR system and 'Rx beam ID' may be construed as 'QCL reference RS with respect to QCL type D'.

In terms of implementation, the operations of the BS/UE according to the above-described embodiments (e.g., operations related to the transmission of the uplink channel based on at least one of Proposals 1/2/3, and Options 1-1/1-2/1-3/3-1/3-2) may be processed by devices (e.g., processors 102 and 202 in FIG. 18) in FIGS. 17 to 21 to be described below.

Further, the operations of the BS/UE according to the above-described embodiments (e.g., operations related to transmission of the uplink channel based on at least one of proposals 1/2/3 and options 1-1/1-2/1-3/3-1/3-2) may be stored in a memory (e.g., memories 104 and 204 in FIG. 1) in the form of a command/program (e.g., an instruction or executable code) for driving at least one processor (e.g., 102 or 202 in FIG. 18).

Hereinafter, the operations of the UE/BS based on the proposal methods (e.g., Proposals 1/1-1/2/3 and/or Options 1-1/1-2/1-3/3-1/3-2) will be described with reference to FIG. 14.

FIG. 14 illustrates an example of a signaling between UE and a BS to which a method proposed in the present disclosure is applicable. FIG. 14 is just for convenience of the description and does not limit the scope of the present disclosure. Further, some step(s) illustrated in FIG. 14 may be omitted according to a situation and/or a configuration.

In FIG. 14, a case where the UE and/or the BS supports multi-panel transmission/reception is assumed. The UE/BS may correspond to any one of three multi-panel UE categories described above. Further, the panel described in FIG. 14 may be based on the definition of the panel.

Hereinafter, the operation aspect of the UE will be described.

The UE may report UE capability information to the BS (S1410). The UE capability information may include UE capability information related to a panel. As an example, the UE capability information may include the number of panels (groups) which may be supported by the UE, information indicating whether multi-panel based simultaneous transmission may be performed, information on the MPUE category, etc. In this regard, the UE may report, the BS, UE capability information related to the above-described methods (e.g., Proposals 1/1-1/2/3 and/or Options 1-1/1-2/1-3/3-1/3-2). As an example, as in Proposals 1/1-1 and/or Option 1-1, the UE may report, to the BS, at least one of (Tx/Rx)

panel related configuration/information for the multi-CC/ band based operation, whether the panel-level correspondence is established, whether multiple panels are simultaneously activated, or whether multiple panels may be simultaneously used for UL transmission, as the UE capability.

The UE may receive, from the BS, a configuration related to a panel (S1420). As an example, the configuration may include panel related information for UL transmission of the UE (e.g., see panel-specific transmission/reception related configuration/indication). As a specific example, the panel related configuration may be a configuration for UL transmission such as PUCCH, PUSCH, SRS, PRACH, etc. In particular, in relation to the PUCCH transmission, a panel for panel-specific transmission may be identified by PUCCH-SpatialRelationInfo and/or PUCCH-resource.

In this regard, the UE may receive, from the BS, a configuration related to the above-described method (e.g., Proposals 1/1-1/2/3 and/or Options 1-1/1-2/1-3/3-1/3-2). As an example, the UE may receive, from the BS, information on at least one of a configuration related to the panel information valid range, a configuration for UL signals/channels, or a configuration for the UL panel ID in Proposals 1/1-1/2/3 and/or Options 1-1/1-2/1-3/3-1/3-2.

The configuration may be set as a form such as an existing information element (IE) and/or an existing field (e.g., SRS resource indicator (SRI)). The configuration may also be set as a form such as a newly defined IE and/or a newly defined field. The configuration may be transferred through higher layer signaling (e.g., RRC message, MAC-CE).

The UE may perform beam management with the BS for each panel based on the configuration (S1430). As an example, the UE may perform beam training for one or more panels included in the configuration, and may also report, to the BS, the information determined or calculated through this. Further, the beam management (e.g., DL/UL beam management) step may also include a panel indication/or configuration related procedure for the UL transmission. As an example, the DL/UL beam management is performed, and the panel for the UL transmission is indicator and/or configured (e.g., via MAC-CE), and when the UL transmission is triggered (e.g., via DCI), it may be regarded that the indication and/or configuration procedure of the panel for the UL transmission is included in step S1430 above. Further, step S1430 may also be omitted according to whether the beam management needs to be performed, etc. In this regard, in performing the beam management procedure, the UE may also apply the above-described methods (e.g., Proposals 1/1-1/2/3 and/or Options 1-1/1-2/1-3/3-1/3-2).

The UE may receive, from the BS, information (e.g., indication) for scheduling the UL transmission (S1440). The corresponding indication may be performed through the MAC-CE and/or the DCI. As an example, the corresponding indication may include panel related indication information (e.g., see a panel-specific transmission/reception related configuration/indication). As an example, the beam management (e.g., DL/UL beam management) is performed, and the panel for the UL transmission is indicated/configured (e.g., via MAC-CE), and when the UL transmission is triggered, the indication and/or configuration procedure of the panel for the UL transmission may be performed simultaneously with the triggering of the UL transmission. In this case, it may be regarded that the indication and/or configuration procedure of the panel for the UL transmission is included in step S1440 above (e.g., the panel ID may be included in the UL DCI). Further, in the case of the UL transmission requiring like the PUSCH, the corresponding step may be required (however, the configured grant PUSCH is excluded) and in the case of the PUCCH and the SRS (however, aperiodic SRS is excluded), step S1440 may be omitted.

In this regard, the UE may receive, from the BS, an indication related to the above-described method (e.g., Proposals 1/1-1/2/3 and/or Options 1-1/1-2/1-3/3-1/3-2). As an example, the UE may receive, from the BS, an indication related to the panel information valid range, an indication for UL signals/channels, and/or an indication for the UL panel ID in Proposals 1/1-1/2/3 and/or Options 1-1/1-2/1-3/3-1/3-2.

The UE may perform UL transmission using the panel for the BS based on the configuration and/or the indication (S1450). As an example, the UE may perform the UL transmission by using one panel or multiple panels according to the multi-panel UE category. In this regard, the UE may perform the UL transmission to the BS as in the above-described method (e.g., Proposals 1/1-1/2/3 and/or Options 1-1/1-2/1-3/3-1/3-2). As an example, as in Proposal 2/3 and/or Options 3-1/3-2, when there are multiple uplink signals/channels configured/indicated to be transmitted to the same symbol position, the UE may simultaneously transmit two or more uplink signals/channels or one uplink signal/channel based on a specific rule (e.g., a collision handling rule, a priority of transmitted information, a power headroom condition, a transmissions power condition, etc.).

Hereinafter, the operation aspect of the BS will be described.

The BS may receive a report for UE capability information from the UE (S1410). The UE capability information may include UE capability information related to a panel. As an example, the UE capability information may include the number of panels (groups) which may be supported by the UE, information indicating whether multi-panel based simultaneous transmission may be performed, information on the MPUE category, etc. In this regard, the BS may be report with UE capability information related to the above-described methods (e.g., Proposals 1/1-1/2/3 and/or Options 1-1/1-2/1-3/3-1/3-2) from the UE. As an example, as in Proposals 1/1-1 and/or Option 1-1, the BS may receive at least one of (Tx/Rx) panel related configuration/information for the multi-CC/band based operation, whether the panel-level correspondence is established, whether multiple panels are simultaneously activated, or whether multiple panels may be simultaneously used for UL transmission, as the UE capability.

The BS may transmit a panel related configuration to the UE (S1420). As an example, the configuration may include panel related information for UL transmission of the UE (e.g., see panel-specific transmission/reception related configuration/indication). As a specific example, the panel related configuration may be a configuration for UL transmission such as PUCCH, PUSCH, SRS, PRACH, etc. In particular, in relation to the PUCCH transmission, a panel for panel-specific transmission may be identified by PUCCH-SpatialRelationInfo and/or PUCCH-resource.

In this regard, the BS may transmit, to the UE, a configuration related to the above-described method (e.g., Proposals 1/1-1/2/3 and/or Options 1-1/1-2/1-3/3-1/3-2). As an example, the BS may transmit, to the UE, information on at least one of a configuration related to the panel information valid range, a configuration for UL signals/channels, or a configuration for the UL panel ID in Proposals 1/1-1/2/3 and/or Options 1-1/1-2/1-3/3-1/3-2.

The configuration may be set as a form such as an existing information element (IE) and/or an existing field (e.g., SRS resource indicator (SRI)). The configuration may also be set as a form such as a newly defined IE and/or a newly defined field. The configuration may be transferred through higher layer signaling (e.g., RRC message, MAC-CE).

The BS may perform beam management with the UE for each panel based on the configuration (S1430). As an example, the UE may perform beam training for one or more panels included in the configuration, and may also report, to the BS, the information determined or calculated through this. Further, the beam management (e.g., DL/UL beam management) step may also include a panel indication/or configuration related procedure for the UL transmission. As an example, the DL/UL beam management is performed, and the panel for the UL transmission is indicator and/or configured (e.g., via MAC-CE), and when the UL transmission is triggered (e.g., via DCI), it may be regarded that the indication and/or configuration procedure of the panel for the UL transmission is included in step S1430 above. Further, step S1430 may also be omitted according to whether the beam management needs to be performed, etc. In this regard, in performing the beam management procedure, the BS may also apply the above-described methods (e.g., Proposals 1/1-1/2/3 and/or Options 1-1/1-2/1-3/3-1/3-2).

The BS may transmit, to the UE, information (e.g., indication) for scheduling the UL transmission (S1440). The corresponding indication may be performed through the MAC-CE and/or the DCI. As an example, the corresponding indication may include panel related indication information (e.g., see a panel-specific transmission/reception related configuration/indication). As an example, the beam management (e.g., DL/UL beam management) is performed, and the panel for the UL transmission is indicated/configured (e.g., via MAC-CE), and when the UL transmission is triggered, the indication and/or configuration procedure of the panel for the UL transmission may be performed simultaneously with the triggering of the UL transmission. In this case, it may be regarded that the indication and/or configuration procedure of the panel for the UL transmission is included in step S1440 above (e.g., the panel ID may be included in the UL DCI). Further, in the case of the UL transmission requiring like the PUSCH, the corresponding step may be required (however, the configured grant PUSCH is excluded) and in the case of the PUCCH and the SRS (however, aperiodic SRS is excluded), step S1440 may be omitted.

In this regard, the BS may transmit, to the UE, an indication related to the above-described method (e.g., Proposals 1/1-1/2/3 and/or Options 1-1/1-2/1-3/3-1/3-2). As an example, the BS may transmit, to the UE, an indication related to the panel information valid range, an indication for UL signals/channels, and/or an indication for the UL panel ID in Proposals 1/1-1/2/3 and/or Options 1-1/1-2/1-3/3-1/3-2.

The BS may receive, from the UE, UL transmission using the panel for the BS based on the configuration and/or the indication (S1450). As an example, the UE may perform the UL transmission by using one panel or multiple panels according to the multi-panel UE category. In this regard, the BS may receive, from the UE, the UL transmission as in the above-described method (e.g., Proposals 1/1-1/2/3 and/or Options 1-1/1-2/1-3/3-1/3-2). As an example, as in Proposal 2/3 and/or Options 3-1/3-2, when there are multiple uplink signals/channels configured/indicated to be transmitted to the same symbol position, the BS may receive two or more uplink signals/channels or one uplink signal/channel based on a specific rule (e.g., a collision handling rule, a priority of transmitted information, a power headroom condition, a transmissions power condition, etc).

Further, the BS operation and/or the UE operation (e.g., Proposals 1/1-1/2/3 and/or Options 1-1/1-2/1-3/3-1/3-2 and/or FIG. 14) may be implemented by the devices described below (e.g., FIGS. 17 to 21).

Hereinafter, the above-described embodiments will be described in detail with reference to FIG. 15 in terms of the operation of the UE. Methods to be described below are just distinguished for convenience and it is needless to say that some components of any one method may be substituted with some components of another method or may be applied in combination with each other.

FIG. 15 is a flowchart for describing a method of transmitting, by a UE, an uplink channel in a wireless communication system according to an embodiment of the present disclosure.

Referring to FIG. 15, a method for transmitting, by UE, an uplink channel in a wireless communication system according to an embodiment of the present disclosure may include a step of transmitting UE capability information (S1510), a step of receiving scheduling information of the uplink channel (S1520), and a step of transmitting the uplink channel (S1530).

In S1510, the UE transmits UE capability information related to multiple panels. The UE capability information may be information based on Proposal 1 above.

According to an embodiment, the multiple panels may be related to multiple frequency regions. The frequency region may be based on a component carrier (CC) or a frequency band.

According to an embodiment, the UE capability information may include at least one of i) information on at least one panel commonly applied to at least one frequency region of the multiple frequency regions or ii) information on a range of the frequency regions to which at least panel is commonly applied among the multiple panels. The range of the frequency regions may be based on intra-band CCs or inter-band CCs (within a specific band combination). The embodiment may be based on Proposal 1.

According to an embodiment, the UE capability information may include information on whether a panel-level correspondence is established. The panel-level correspondence may be established based on at least one frequency region of the multiple frequency regions. The embodiment may be based on Option 1-1.

Based on that the panel-level correspondence is established, the information on the at least one panel included in the UE capability information may be information on a transmission (Tx) panel or a reception (Rx) panel. That is, since the panel-level correspondence is established, even though only information of any one of the Tx panel or the Rx panel is included, it is possible to indicate a (Tx or Rx) panel not included in the corresponding UE information.

Based on that the panel-level correspondence is not established, the information on the at least one panel included in the UE capability information may include the information on the Tx panel or the Rx panel.

According to an embodiment, the information on the at least one panel included in the UE capability information may include information on at least one of the number of panels, the number of antenna ports per panel, or the number of beams generable per panel. The embodiment may be based on the panel information of Option 1-1 above.

According to an embodiment, alteration of the panel applied to the specific frequency region which belongs to the range of the frequency regions can be equally applied to remaining frequency regions which belong to the range of the frequency regions. The embodiment may be based on Option 1-3 above.

According to an embodiment, the UE capability information may include information on at least one of i) whether the multiple panels may be simultaneously activated or ii) whether the multiple panels may be used for simultaneous transmission of specific uplink channels. In this case, the corresponding information may be related to the range of the frequency regions. The embodiment may be based on Proposal 1-1 above.

According to S1510 described above, an operation of the UE (100/200 in FIGS. 17 to 21) which transmits, to the UE (100/200 in FIGS. 17 to 21), UE capability information related to multiple panels may be implemented by the devices of FIGS. 17 to 21. For example, referring to FIG. 18, one or more processors 102 may control one or more transceivers 106 and/or one or more memories 104 so as to transmit the UE capability information related to the multiple panels to the BS 200.

In S1520, the UE receives, from the BS, scheduling information related to the transmission of the uplink channel.

According to an embodiment, the scheduling information includes information indicating at least one of the multiple panels. The scheduling information may be based on the information indicating the uplink transmission (e.g., PUCCH/PUSCH/SRS/PRACH, etc.) in Option 1-2 above. Specifically, the scheduling information may be based on an RRC message, an MAC-CE message, or DCI.

According to an embodiment, the scheduling information may include information on a panel applied to a specific frequency region among the multiple frequency regions. The information on the panel applied to the specific frequency region may be based on information on a panel applied to a different frequency region which belongs to the frequency of the frequency regions. The embodiment may be based on Option 1-2 above.

According to S1520 described above, an operation of the UE (100/200 in FIGS. 17 to 17) which receives, from the BS (100/200 in FIGS. 17 to 21), scheduling information of related to the transmission of the uplink channel may be implemented by the devices of FIGS. 17 to 21. For example, referring to FIG. 18, one or more processors 102 may control one or more transceivers 106 and/or one or more memories 104 so as to receive, from the BS 200, the scheduling information related to the transmission of the uplink channel.

In S1530, the UE transmits the uplink channel to the BS.

According to an embodiment of the present disclosure, based on that the uplink channel is multiple uplink channels configured in the same time resource region, uplink channels determined based on a first rule related to collision handling among the multiple uplink channels may be transmitted. The embodiment may be based on Proposal 2 above.

The multiple uplink channels may be grouped into multiple uplink channel groups based on a panel ID, and the first rule may be applied to the uplink channels in the uplink channel group. The first rule may be based on the collision handling rule preferentially applied in Proposal 2 above.

Based on that the number of multiple uplink channel groups is larger than a predetermined value, uplink channel groups may be determined based on a second rule related to the collision handling among the multiple uplink channel groups. The predetermined value may be based on a Y value of Proposal 2 above. The number of determined uplink channel groups may be equal to or smaller than the number of panels which may be simultaneously activated among the multiple panels. The number of panels which may be simultaneously activated may be based on an X value of Proposal 2 above.

The second rule may be related to at least one of transmission power for each panel requested for transmission of each uplink channel which belongs to the multiple uplink channel groups or a priority of each uplink channel. The second rule may be based on the collision handling rule additionally applied in Proposal 2 above.

According to an embodiment, the uplink channel may be based on multiple uplink channels configured in the same time resource regions and the multiple uplink channels may be based on an uplink channel combination of which simultaneous transmission is permitted. The embodiment may be based on Proposal 3 above.

Based on that the same panel ID is configured in the multiple uplink channels, the multiple uplink channels may be transmitted through a panel related to the panel ID among the multiple panels.

According to an embodiment, based on that different panel IDs are configured in the multiple uplink channels, the multiple uplink channels may be transmitted through a panel related to a panel ID configured in a specific uplink channel. The specific uplink channel may be an uplink channel determined based on a priority, a transmission power, or a power headroom of each uplink channel among the multiple uplink channels. The embodiment may be based on Option 3-1 above.

According to an embodiment, only at least one uplink channel according to an order having a high priority may be transmitted among the multiple uplink channels based on that different panel IDs are configured in the multiple uplink channels. The priority may be based on at least one of a type of uplink channel or a usage of the uplink channel. The embodiment may be based on Option 3-2 above.

According to S1530 described above, an operation of the UE (100/200 in FIGS. 17 to 21) which transmits, to the BS (100/200 in FIGS. 17 to 21), the uplink channel may be implemented by the devices of FIGS. 17 to 21. For example, referring to FIG. 18, one or more processors 102 may control one or more transceivers 106 and/or one or more memories 104 so as to transmit, to the BS 200, the uplink channel.

Hereinafter, the above-described embodiments will be described in detail with reference to FIG. 16 in terms of the operation of the BS. Methods to be described below are just distinguished for convenience and it is needless to say that some components of any one method may be substituted with some components of another method or may be applied in combination with each other.

FIG. 16 is a flowchart for describing a method of receiving, by a BS, an uplink channel in a wireless communication system according to another embodiment of the present disclosure.

Referring to FIG. 16, a method for receiving, by the BS, an uplink channel in a wireless communication system according to another embodiment of the present disclosure may include a step of receiving UE capability information (S1610), a step of transmitting scheduling information of the uplink channel (S1620), and a step of receiving the uplink channel (S1630).

In S1610, the BS receives, from the UE, UE capability information related to multiple panels. The UE capability information may be information based on Proposal 1 above.

According to an embodiment, the multiple panels may be related to multiple frequency regions. The frequency region may be based on a component carrier (CC) or a frequency band.

According to an embodiment, the UE capability information may include at least one of i) information on at least one panel commonly applied to at least one frequency region of the multiple frequency regions or ii) information on a range of the frequency regions to which at least panel is commonly applied among the multiple panels. The range of the frequency regions may be based on intra-band CCs or inter-band CCs (within a specific band combination). The embodiment may be based on Proposal 1 above.

According to an embodiment, the UE capability information may include information on whether a panel-level correspondence is established. The panel-level correspondence may be established based on at least one frequency region of the multiple frequency regions. The embodiment may be based on Option 1-1 above.

Based on that the panel-level correspondence is established, the information on the at least one panel included in the UE capability information may be information on a transmission (Tx) panel or a reception (Rx) panel. That is, since the panel-level correspondence is established, even though only information of any one of the Tx panel or the Rx panel is included, it is possible to indicate a (Tx or Rx) panel not included in the corresponding UE information.

Based on that the panel-level correspondence is not established, the information on the at least one panel included in the UE capability information may include the information on the Tx panel or the Rx panel.

According to an embodiment, the information on the at least one panel included in the UE capability information may include information on at least one of the number of panels, the number of antenna ports per panel, or the number of beams generable per panel. The embodiment may be based on the panel information of Option 1-1 above.

According to an embodiment, alteration of the panel applied to the specific frequency region which belongs to the range of the frequency regions can be equally applied to remaining frequency regions which belong to the range of the frequency regions. The embodiment may be based on Option 1-3 above.

According to an embodiment, the UE capability information may include information on at least one of i) whether the multiple panels may be simultaneously activated or ii) whether the multiple panels may be used for simultaneous transmission of specific uplink channels. In this case, the corresponding information may be related to the range of the frequency regions. The embodiment may be based on Proposal 1-1 above.

According to S1610 described above, an operation of the BS (100/200 in FIGS. 17 to 21) which receives, from the UE (100/200 in FIGS. 17 to 21), UE capability information related to multiple panels may be implemented by the devices of FIGS. 17 to 21. For example, referring to FIG. 18, one or more processors 202 may control one or more transceivers 206 and/or one or more memories 204 so as to receive the UE capability information related to the multiple panels from the UE 100.

In S1620, the BS transmits, to the UE, scheduling information related to the reception of the uplink channel.

According to an embodiment, the scheduling information includes information indicating at least one of the multiple panels. The scheduling information may be based on the information indicating the uplink reception (e.g., PUCCH/PUSCH/SRS/PRACH, etc.) in Option 1-2 above. Specifically, the scheduling information may be based on an RRC message, an MAC-CE message, or DCI.

According to an embodiment, the scheduling information may include information on a panel applied to a specific frequency region among the multiple frequency regions. The information on the panel applied to the specific frequency region may be based on information on a panel applied to a different frequency region which belongs to the frequency of the frequency regions. The embodiment may be based on Option 1-2 above.

According to S1620 described above, an operation of the BS (100/200 in FIGS. 17 to 17) which transmits, to the UE (100/200 in FIGS. 17 to 21), scheduling information of related to the reception of the uplink channel may be implemented by the devices of FIGS. 17 to 21. For example, referring to FIG. 18, one or more processors 202 may control one or more transceivers 206 and/or one or more memories 204 so as to transmit, to the UE 100, the scheduling information related to the reception of the uplink channel.

In S1630, the BS receives the uplink channel from the UE.

According to an embodiment of the present disclosure, based on that the uplink channel is multiple uplink channels configured in the same time resource region, uplink channels determined based on a first rule related to collision handling among the multiple uplink channels may be transmitted. The embodiment may be based on Proposal 2 above.

The multiple uplink channels may be grouped into multiple uplink channel groups based on a panel ID, and the first rule may be applied to the uplink channels in the uplink channel group. The first rule may be based on the collision handling rule preferentially applied in Proposal 2 above.

Based on that the number of multiple uplink channel groups is larger than a predetermined value, uplink channel groups may be determined based on a second rule related to the collision handling among the multiple uplink channel groups. The predetermined value may be based on a Y value of Proposal 2 above. The number of determined uplink channel groups may be equal to or smaller than the number of panels which may be simultaneously activated among the multiple panels. The number of panels which may be simultaneously activated may be based on an X value of Proposal 2 above.

The second rule may be related to at least one of transmission power for each panel requested for transmission of each uplink channel which belongs to the multiple uplink channel groups or a priority of each uplink channel. The second rule may be based on the collision handling rule additionally applied in Proposal 2 above.

According to an embodiment, the uplink channel may be based on multiple uplink channels configured in the same time resource regions and the multiple uplink channels may be based on an uplink channel combination of which simultaneous transmission is permitted. The embodiment may be based on Proposal 3 above.

Based on that the same panel ID is configured in the multiple uplink channels, the multiple uplink channels may be transmitted through a panel related to the panel ID among the multiple panels.

According to an embodiment, based on that different panel IDs are configured in the multiple uplink channels, the multiple uplink channels may be transmitted through a panel related to a panel ID configured in a specific uplink channel. The specific uplink channel may be an uplink channel determined based on a priority, a transmission power, or a power headroom of each uplink channel among the multiple uplink channels. The embodiment may be based on Option 3-1 above.

According to an embodiment, only at least one uplink channel according to an order having a high priority may be transmitted among the multiple uplink channels based on that different panel IDs are configured in the multiple uplink channels. The priority may be based on at least one of a type of uplink channel or a usage of the uplink channel. The embodiment may be based on Option 3-2 above.

According to S1630 described above, an operation of the BS (100/200 in FIGS. 17 to 21) which receives, from the UE (100/200 in FIGS. 17 to 21), the uplink channel may be implemented by the devices of FIGS. 17 to 21. For example, referring to FIG. 18, one or more processors 202 may control one or more transceivers 206 and/or one or more memories 204 so as to receive, from the UE 100, the uplink channel.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 17 illustrates a communication system 1 applied to the present disclosure.

Referring to FIG. 17, a communication system 1 applied to the present disclosure includes wireless devices, Base Stations (BSs), and a network. Herein, the wireless devices represent devices performing communication using Radio Access Technology (RAT) (e.g., 5G New RAT (NR) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure.

FIG. 18 illustrates wireless devices applicable to the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 19 illustrates a signal process circuit for a transmission signal.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency region. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 20 illustrates another example of a wireless device applied to the present disclosure.

The wireless device may be implemented in various forms according to a use-case/service (refer to FIG. 17). Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 21 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Effects of the method for transmitting and receiving an uplink channel in a wireless communication system, and the device for the same according to an embodiment of the present disclosure are described below.

According to an embodiment of the present disclosure, scheduling information related to transmission of an uplink channel is transmitted based on UE capability information related to a multiple panels, and as a result, the uplink channel is transmitted. The multiple panels are related to a plurality of frequency regions, and the scheduling information includes information representing at least one panel of the multiple panels. The UE capability information includes at least one of i) information on at least one panel commonly applied to at least one frequency region of the multiple frequency regions or ii) information on a range of the frequency regions to which at least panel is commonly applied among the multiple panels.

Accordingly, scheduling of the uplink channel for multi-channel UE can be performed by considering a single/multi-carrier based operation of the corresponding UE. Further, the transmission of the uplink channel can be performed to be suitable for a multi-panel implementation scheme of the UE, and as a result, reliability of the uplink channel transmission of the multi-panel UE can be improved.

According to an embodiment of the present disclosure, the UE capability information can include information regarding whether panel-level correspondence is established, and the panel-level correspondence can be established based on at least one frequency region of the plurality of frequency regions. Accordingly, the scheduling of the uplink channel can be more effectively performed based on whether the panel-level correspondence is established. Further, when the panel-level correspondence is established, only information on a transmission panel or a reception panel is included in the UE capability information, and as a result, signaling overhead can be reduced.

According to an embodiment of the present disclosure, the scheduling information can include information on a panel applied to a specific frequency region among the plurality of frequency regions, and the information on the panel applied to the specific frequency region can be based on information on a panel applied to another frequency region which belongs to a range of the frequency regions. Accordingly, when the UE transmits the uplink channel based on a specific panel in another frequency region, the corresponding panel information can be utilized, and as a result, a panel indication for scheduling of the transmission of the uplink channel in the specific frequency region can be more effectively performed.

According to an embodiment of the present disclosure, alteration of the panel applied to the specific frequency region which belongs to the range of the frequency regions can be equally applied to remaining frequency regions which belong to the range of the frequency regions. Accordingly, when a specific event such as a beam failure occurs and the panel applied to the specific frequency region is altered, the alteration is equally applied to frequency regions related/adjacent thereto, thereby preventing the signaling overhead from occurring for an update related to panel information.

According to an embodiment of the present disclosure, the UE capability information includes information on at least one of i) whether the multiple panels may be simultaneously activated or ii) whether the multiple panels may be used for simultaneous transmission of specific uplink channels, and the corresponding information may be related to the range of the frequency regions. Accordingly, the scheduling of the uplink channel transmission can be performed in association with the panel implementation scheme of the multi-panel UE and the multi-carrier based operation.

According to an embodiment of the present disclosure, based on that the uplink channel is multiple uplink channels configured in the same time resource region, uplink channels determined based on a first rule related to collision handling among the multiple uplink channels are transmitted. The multiple uplink channels are grouped into multiple uplink channel groups based on a panel ID, and the first rule can be applied to the uplink channels in the uplink channel group. Accordingly, the uplink channels which can be simultaneously transmitted are determined for each panel, and as a result, the collision can be effectively prevented when the multi-panel UE transmits the plurality of uplink channels.

According to an embodiment of the present disclosure, based on that the number of multiple uplink channel groups is larger than a predetermined value, uplink channel groups are determined based on a second rule related to the collision handling among the multiple uplink channel groups. The number of determined uplink channel groups is equal to or smaller than the number of panels which can be simultaneously activated among the multiple panels and the second rule can be related to at least one of transmission power for each panel required for the transmission of each uplink channel which belongs to the plurality of uplink channel groups or a priority of each uplink channel.

As an additional collision management rule (second rule) is applied as such, the plurality of uplink channels can be transmitted within a capability range (the transmission power and the number of activated panels) of the multi-panel UE. Accordingly, the reliability of the transmission of the multiple uplink channels through multiple panels can be improved.

According to an embodiment of the present disclosure, the uplink channel can be based on multiple uplink channels configured in the same time resource regions and the multiple uplink channels can be based on an uplink channel combination of which simultaneous transmission is permitted. According to whether the same panel ID is configured for the multiple uplink channels, the multiple uplink channels can be simultaneously transmitted based on the same panel ID or a panel ID determined according to a configured scheme.

Accordingly, the simultaneous transmission of the multiple uplink channels is permitted based on a preconfigured combination and different panel IDs are configured in the multiple uplink channels, the uplink channels are transmitted based on a specific panel ID, thereby preventing the ambiguity on a UE operation.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method comprising:
  transmitting, by a user equipment (UE), a random access preamble;
  receiving, by the UE, a random access response;
  transmitting, by the UE, a message 3;
  receiving, by the UE, a contention resolution message;
  transmitting, by the UE, UE capability information including information related to multiple panels of the UE;
  receiving, by the UE, scheduling information related to a transmission of an uplink channel;
  based on the scheduling information related to multiple uplink channels configured in a same time resource region, grouping the multiple uplink channels into multiple uplink channel groups based on a panel identifier (ID);
  applying a first rule related to collision handling to uplink channels within each of the multiple uplink channel groups;
  based on a number of the multiple uplink channel groups being greater than a predetermined value, determining one or more uplink channel groups to transmit from the multiple uplink channel groups based on a second rule related to collision handling among the multiple uplink channel groups; and
  transmitting, by the UE, the uplink channel based on the one or more uplink channel groups, wherein the multiple panels are related to multiple frequency regions,
wherein the scheduling information includes information indicating at least one of the multiple panels, and
wherein the UE capability information includes information on a range of the multiple frequency regions to which at least two panels are commonly applied among the multiple panels.

2. The method of claim 1,
wherein the UE capability information further includes information on the at least two panels commonly applied to at least two frequency regions of the multiple frequency regions, and
wherein the at least two frequency regions are based on a component carrier (CC) or a frequency band.

3. The method of claim 2, wherein the information on the at least two panels included in the UE capability information includes information on at least one of a number of panels, a number of antenna ports per panel, or a number of beams generable per panel.

4. The method of claim 1, wherein the UE capability information further includes information on whether a panel-level correspondence is established, and
the panel-level correspondence is established based on at least one frequency region of the multiple frequency regions.

5. The method of claim 4, wherein based on that the panel-level correspondence is established, the information on the at least two panels included in the UE capability information is information on a transmission (Tx) panel or a reception (Rx) panel, and
based on that the panel-level correspondence is not established, the information on the at least two panels included in the UE capability information includes the information on the Tx panel and the Rx panel.

6. The method of claim 1, wherein the scheduling information includes information on a panel applied to a specific frequency region among the multiple frequency regions, and
the information on the panel applied to the specific frequency region is based on information on a panel applied to a different frequency region which belongs to the range of the multiple frequency regions.

7. The method of claim 6, wherein alteration of the panel applied to the specific frequency region which belongs to the range of the multiple frequency regions is equally applied to remaining frequency regions which belong to the range of the frequency regions.

8. The method of claim 1, wherein the UE capability information includes information on at least one of i) whether the multiple panels may be simultaneously activated or ii) whether the multiple panels may be used for simultaneous transmission of specific uplink channels.

9. The method of claim 1, wherein the predetermined value is a number of panels which may be simultaneously activated among the multiple panels.

10. The method of claim 1, wherein the second rule is related to at least one of transmission power for each panel requested for transmission of each uplink channel which belongs to the multiple uplink channel groups or a priority of each uplink channel.

11. The method of claim 1, wherein the uplink channel is based on multiple uplink channels configured in same time resource regions and the multiple uplink channels are based on an uplink channel combination of which simultaneous transmission is permitted.

12. The method of claim 11, wherein based on that a same panel identifier (ID) is configured to the multiple uplink channels, the multiple uplink channels are transmitted through a panel related to the panel ID among the multiple panels.

13. The method of claim 12, wherein based on that different panel IDs are configured to the multiple uplink channels, the multiple uplink channels are transmitted through a panel related to a panel ID configured to a specific uplink channel, and
the specific uplink channel is an uplink channel determined based on a priority, a transmission power, or a power headroom of each uplink channel among the multiple uplink channels.

14. The method of claim 12, wherein only at least one uplink channel according to an order having a priority is transmitted among the multiple uplink channels based on that different panel IDs are configured in the multiple uplink channels, and
the priority is based on at least one of a type of uplink channel or a usage of the uplink channel.

15. A user equipment (UE) comprising:
one or more transceivers;
one or more processors controlling the one or more transceivers; and
one or more memories operably connectable to the one or more processors, and storing instructions that, when executed by the one or more processors, configure the one or more processors to perform operations,
wherein the operations comprise:
transmitting, by a user equipment (UE), a random access preamble;
receiving, by the UE, a random access response;
transmitting, by the UE, a message 3;
receiving, by the UE, a contention resolution message;
transmitting, by the UE, UE capability information including information related to multiple panels of the UE;
receiving, by the UE, scheduling information related to a transmission of an uplink channel;
based on the scheduling information related to multiple uplink channels configured in a same time resource region, grouping the multiple uplink channels into multiple uplink channel groups based on a panel identifier (ID);
applying a first rule related to collision handling to uplink channels within each of the multiple uplink channel groups;
based on a number of the multiple uplink channel groups being greater than a predetermined value, determining one or more uplink channel groups to transmit from the multiple uplink channel groups based on a second rule related to collision handling among the multiple uplink channel groups; and
transmitting, by the UE, the uplink channel based on the one or more uplink channel groups,
wherein the multiple panels are related to multiple frequency regions,
wherein the scheduling information includes information indicating at least one of the multiple panels, and
wherein the UE capability information includes information on a range of the multiple frequency regions to which at least two panels are commonly applied among the multiple panels.

16. A device comprising: one or more memories and one or more processors functionally connected to the one or more memories, wherein the one or more memories store instructions that, when executed by the one or more processors, configure the one or more processors to perform operations, wherein the operations comprise:

transmitting a random access preamble;

receiving a random access response;

transmitting a message 3;

receiving a contention resolution message;

transmitting user equipment capability (UE capability) information including information related to multiple panels of the UE, receiving scheduling information related to a transmission of an uplink channel;

based on the scheduling information related to multiple uplink channels configured in a same time resource region, grouping the multiple uplink channels into multiple uplink channel groups based on a panel identifier (ID);

applying a first rule related to collision handling to uplink channels within each of the multiple uplink channel groups;

based on a number of the multiple uplink channel groups being greater than a predetermined value, determining one or more uplink channel groups to transmit from the multiple uplink channel groups based on a second rule related to collision handling among the multiple uplink channel groups; and transmitting the uplink channel based on the one or more uplink channel groups, wherein the multiple panels are related to multiple frequency regions, wherein the scheduling information includes information indicating at least one of the multiple panels, and wherein the UE capability information includes information on a range of the multiple frequency regions to which at least two panels are commonly applied among the multiple panels.

* * * * *